United States Patent
Snyder

[15] 3,684,860
[45] Aug. 15, 1972

[54] ELECTRIC TOASTER WITH IMPROVED HEAT-UP COOL-DOWN BIMETAL TIMER

[72] Inventor: Paul V. Snyder, Whitehall, Pa.
[73] Assignee: General Electric Company
[22] Filed: July 22, 1971
[21] Appl. No.: 165,203

[52] U.S. Cl. ..................219/413, 99/329, 99/393, 99/443 R, 219/398, 219/405
[51] Int. Cl. ..........................................F27d 11/02
[58] Field of Search......219/395, 398, 405, 412, 413, 219/521; 99/329, 359, 378, 389, 393, 443 R; 236/68; 126/335

[56] References Cited

UNITED STATES PATENTS

| | | | |
|---|---|---|---|
| 2,257,906 | 10/1941 | Gough | 99/327 |
| 2,563,755 | 8/1951 | Sutton et al. | 99/329 |
| 2,624,268 | 1/1953 | Horvath | 99/329 |
| 2,773,441 | 12/1956 | Ireland | 99/329 |
| R23,600 | 12/1952 | Gardner | 99/329 |
| 2,643,061 | 6/1953 | Johnson | 236/68 |
| 2,748,244 | 5/1956 | Nellis | 219/398 |
| 3,119,000 | 1/1964 | Loch et al. | 219/413 |
| 3,119,001 | 1/1964 | Andrews | 219/413 |
| 3,152,243 | 10/1964 | Andrews | 219/405 |
| 3,412,236 | 11/1968 | Hild et al. | 219/413 |
| 3,560,711 | 2/1971 | Manecke | 219/413 |
| 3,585,360 | 6/1971 | Young et al. | 219/405 |
| 3,529,534 | 9/1970 | Snyder | 99/329 |

*Primary Examiner*—Volodymyr Y. Mayewsky
*Attorney*—Lawrence R. Kempton et al.

[57] ABSTRACT

An electric toaster with a heat-up cool-down bimetal timer wherein a separate bimetal timer control blade is positioned between a bimetal and its support for accurately controlling the pivot point of the bimetal during its heat-up cycle. A calibration screw is threaded through an end portion of the bimetal control blade. The calibration screw rests against a cam follower, and an improved arrangement is provided for adjusting the cam follower for reliably setting the toast brownness or color. A unique manual ON-OFF mechanism is also provided for allowing or preventing the bimetal timer from automatically moving from its heat-up cycle to its cool-down cycle.

13 Claims, 19 Drawing Figures

PATENTED AUG 15 1972

Inventor:
Paul V. Snyder
by
Leonard J Platt
Attorney

Inventor:
Paul V. Snyder
by
Leonard J. Platt
Attorney

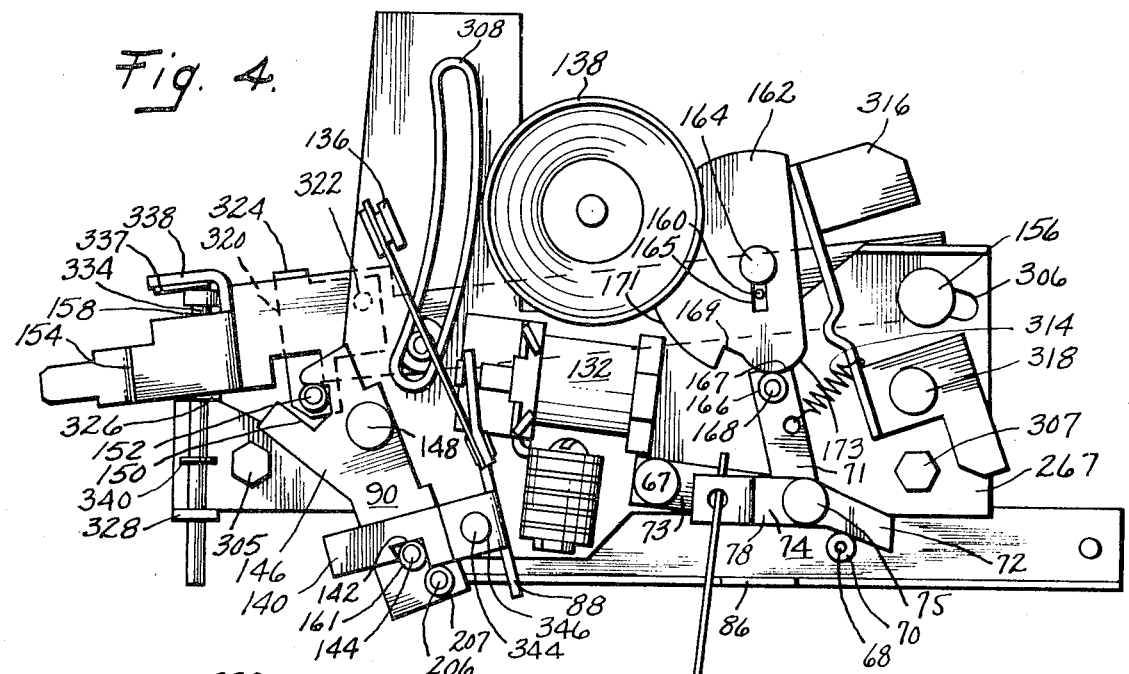
Fig. 4.
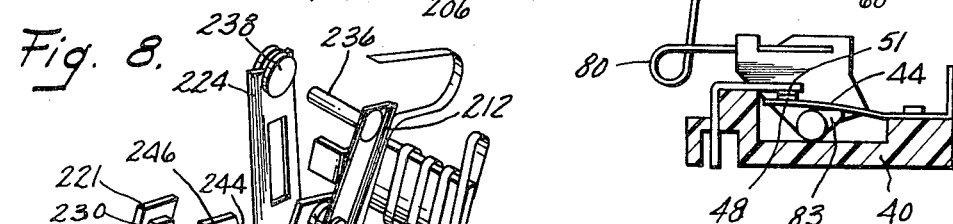
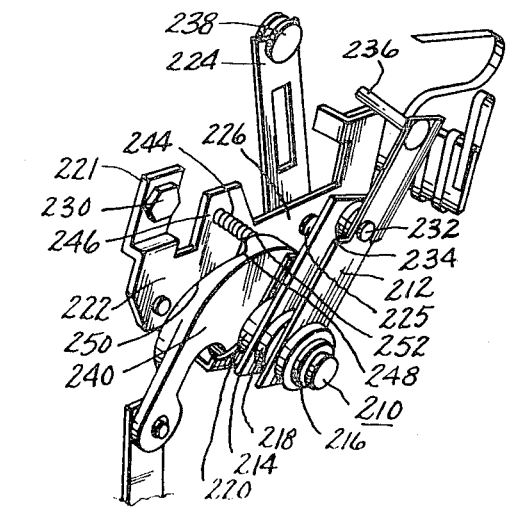
Fig. 8.
Fig. 9.
Inventor:
Paul V. Snyder
by
Leonard J. Platt
Attorney Inventor:
Paul V. Snyder
by
Leonard J. Platt
Attorney

PATENTED AUG 15 1972 3,684,860

Inventor:
Paul V. Snyder
by
Leonard J. Platt
Attorney

Inventor:
Paul V. Snyder
by
Leonard J. Platt
Attorney

ELECTRIC TOASTER WITH IMPROVED HEAT-UP COOL-DOWN BIMETAL TIMER

BACKGROUND OF THE INVENTION

This invention relates to an electric oven toaster, and more particularly to an improved compact heat-up cool-down bimetal timer for timing the toaster heating cycle.

In my prior U.S. Pat. No. 3,529,534, filed Apr. 3, 1969 and assigned to the same assignee as the instant invention, I have disclosed a heat-up cool-down bimetal timer for timing the toasting period in a pop-up type toaster. With such a mechanism, when a slice of bread or other food has been placed in the toaster and the food is lowered by a conventional push-down lever, a switch closes an electric circuit to energize an electric heater which is provided for toasting the bread. At the same time, another heater is energized for heating a bimetal. After the bimetal has been heated a predetermined amount as indicated by the change in the angle of bow of the bimetal, another switch is actuated to de-energize the bimetal heater. Then, the bimetal cools down and after a predetermined time as evidenced by the reverse change in the angle of bow of the bimetal, the bimetal actuates a mechanism for de-energizing the heating element which has been toasting a slice of bread. At the same time, a mechanism is energized for lifting the toast so that it may be removed from the toaster.

In a co-pending application of Harold DeRemer, Ser. No. 165,204, filed July 22, 1971, and assigned to the same assignee as the instant invention, there is disclosed an electric oven toaster with a thermostat for controlling energization of the heating elements when the oven toaster is being operated as an oven and a heat-up cool-down bimetal timer for controlling energization of the heating elements when the oven toaster is being operated as a toaster. My improved heat-up cool-down bimetal timer is partially disclosed in Harold DeRemer's co-pending application and is the subject of the instant application.

While the basic components of a heat-up cool-down bimetal timer have been known, it is especially desirable that a heat-up cool-down bimetal timer be reliably constructed and calibrated so that it will accurately control the duration of a toasting time interval, and hence, the color or degree of brownness of the toast desired by a user of the oven toaster.

It is also desirable that such a heat-up cool-down timer be constructed so that it may be readily and inexpensively incorporated into an electric oven toaster appliance which may be used both as an oven and a toaster.

Accordingly, it is a particular object of this invention to provide an improved heat-up cool-down bimetal timer which may be readily and reliably calibrated during manufacture for providing an effective timer to control the color or brownness of the toast desired by a user of the oven toaster.

It is another object of my invention to provide an improved heat-up cool-down bimetal timer for an oven toaster which may be readily incorporated with the control mechanism for an oven toaster utilizing relatively few parts which may be inexpensively and reliably assembled to the control mechanism of the oven toaster.

It is also an object of this invention to provide an improved color cam mechanism for a heat-up cool-down bimetal timer for manually setting the color and brownness of the toast desired by a user.

SUMMARY OF THE INVENTION

In accordance with one of the aspects of this invention, an electric toaster with my improved heat-up cool-down bimetal timer includes an electric resistance wire heater for toasting a slice of bread or other food, and an electric resistance wire for heating a bimetal during a bimetal heat-up cycle. The toaster also includes a rigid timer body member and a bimetal having two end portions. One of the end portions of the bimetal is connected to the timer body member and the other end portion of the bimetal is a free end portion. A unique arrangement is provided for controlling the pivot point of the free end portion of the bimetal. This arrangement includes a control member which is also connected to the timer body and is provided with a pivot surface which is arranged in engagement with the free end portion of the bimetal. The position of the pivot surface of the bimetal control member with respect to the bimetal is very accurately set by a calibration member which is movably supported on the bimetal control member.

With this construction, the relative position of the pivot point for the free end portion of the bimetal which controls the duration of the heat-up cycle of the bimetal is very accurately controlled and set by a manufacturing adjustment which is made by a calibration member which is supported on a bimetal control member. Thus, in making such a manufacturing adjustment it is not necessary to touch the bimetal itself, and it is also possible to adjust the calibration member with respect to the relatively substantial timer body member which does not move during relatively great changes in temperature or as a result of rough handling of the oven toaster. For example, the calibration member may take the form of a screw having an end which rotates on a flat plate of a manually adjustable cam follower member. By this arrangement, a very reliable and accurate manufacturing calibration may be made in my improved heat-up cool-down bimetal timer.

BRIEF DESCRIPTION OF THE DRAWING

Other objects and attendant advantages of the invention will be apparent from the following description taken in connection with the accompanying drawing in which:

FIG. 4 is a fragmentary side elevational view of a portion of the electric oven toaster control mechanism shown in FIG. 3 illustrating the positions of the parts at the commencement of a toasting cycle;

FIG. 8 is a perspective view of the oven thermostat similar to FIG. 7 showing the thermostat in its OVEN position for regulating the temperature in the oven toaster shown in FIG. 1;

FIG. 9 is a perspective view of the oven thermostat similar to FIG. 7 showing the oven thermostat in its inoperative or TOAST position when the oven toaster is being controlled by its toaster bimetal timer;

DESCRIPTION OF THE PREFERRED EMBODIMENT

Figure 1:
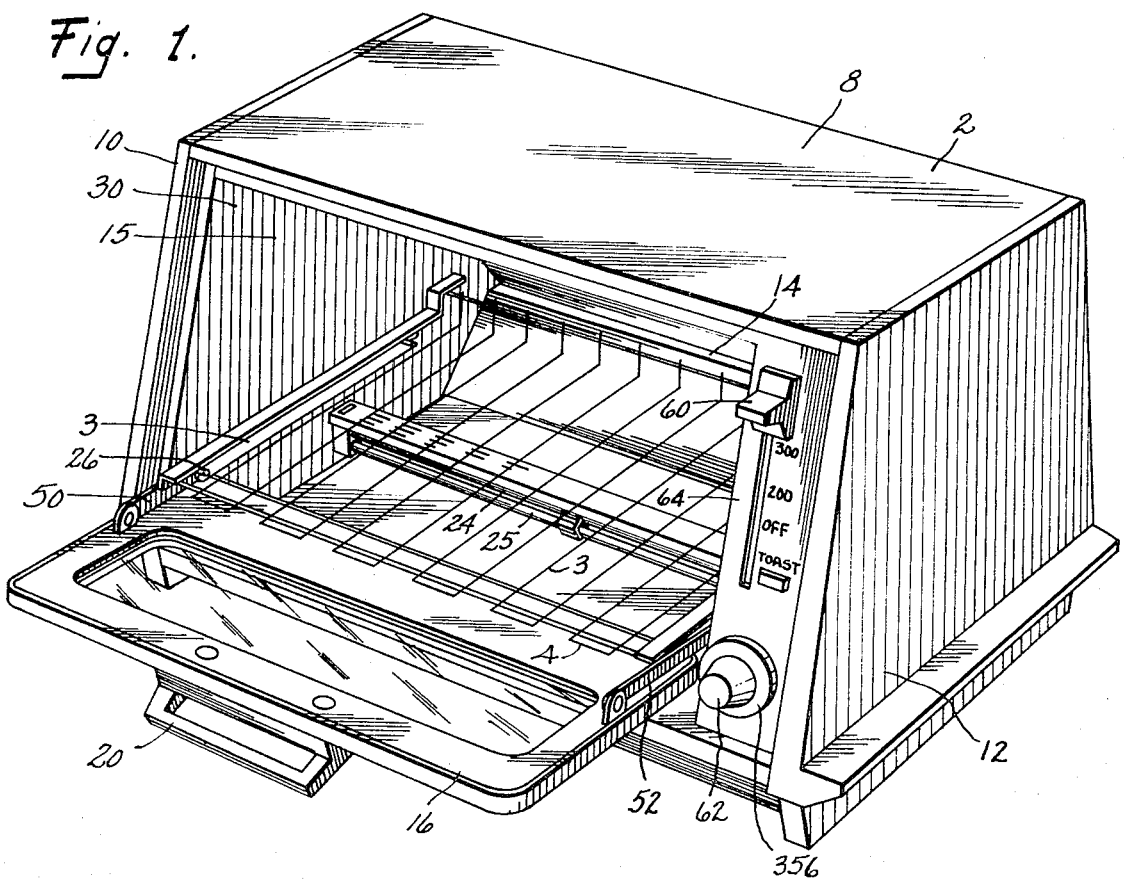
FIG. 1 is a perspective view of an electric oven toaster embodying my improved heat-up cool-down bimetal timer.
Figure 2:
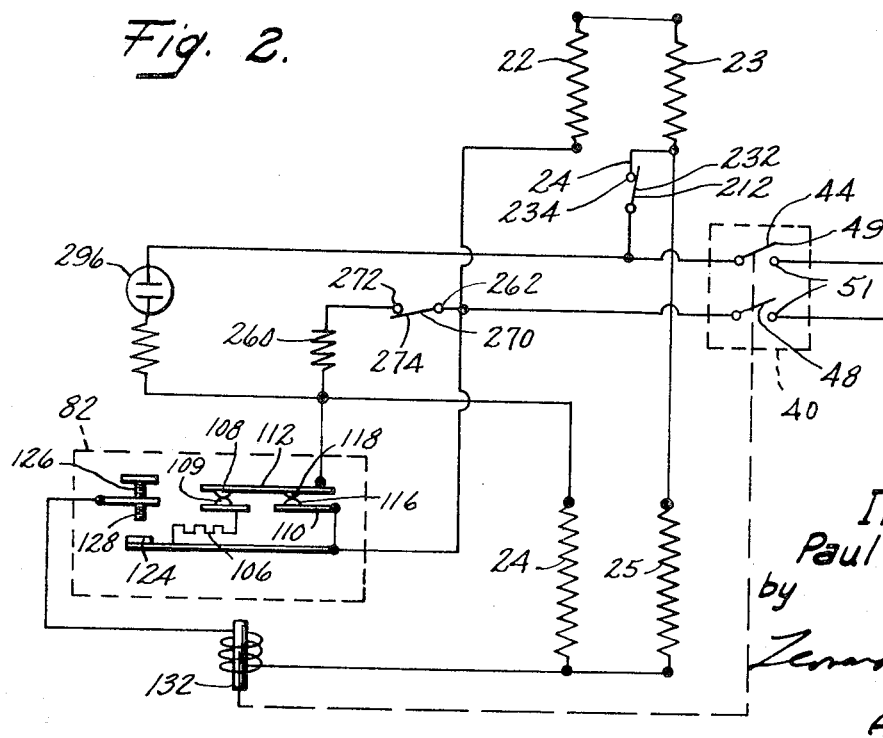
FIG. 2 is a circuit diagram and partial schematic view of portions of the control mechanism for the electric toaster illustrated in FIG. 1.

Referring now to the drawing and first particularly to FIGS. 1 and 2, there is shown an electric oven toaster 2 in which is mounted a generally horizontal carriage 3 for supporting a food rack 4 for holding food to be cooked or bread to be toasted. The oven toaster includes a generally horizontal top wall 8, generally parallel vertical side walls 10 and 12, and a front opening 14 to provide access to the inside of the oven toaster.

Sheet metal side plates 30 and 32 are positioned inside of the outer side walls 10 and 12 to define a cooking and toasting chamber 15. The oven toaster also includes upper sheathed electric elements 22 and 23 and lower heating elements 24 and 25 for toasting bread and heating the cooking chamber 15.

A front door 16 is provided for closing the front opening 14. The door 16 is pivotally mounted to the lower portion of the oven toaster, and as shown in FIG. 1 it is in its generally horizontal full open position.

Figure 19:
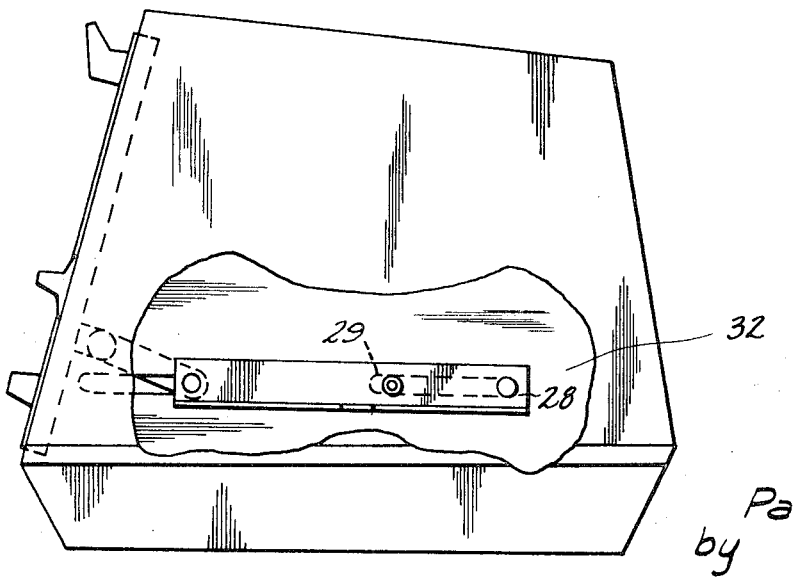
FIG. 19 is a side elevational view of the oven toaster shown in FIG. 1 with portions of the right outside wall broken away to show details of construction.

The food rack 4 is arranged to be moved partially through the front opening 14 of the oven toaster when the door is moved to its full open position as shown in FIG. 1. To achieve this in a conventional manner, the carriage 3 for supporting the food rack 4 includes two carriage links 26 and 28 which are mounted for slidable movement in a forward or rearward direction in the oven toaster. As shown in FIG. 19, a pair of slots 27 and 29 are formed in each of the sheet metal side plates 30 and 32 of the oven toaster, and outwardly projecting support pins 34 are inserted through the slots 27 and 29 and are riveted or otherwise secured to the carriage links 26 and 28 in order to slidably support the carriage links 26 and 28 on the side plates 30 and 32 of the oven toaster. The details of the door operating mechanism and the arrangement for supporting the carriage links 26 and 28 on the sheet metal side plates 30 and 32 of the oven toaster do not form a part of this invention and are described and illustrated in greater detail in a co-pending application of Paul V. Synder, Ser. No. 90,903, filed Nov. 19, 1971, and assigned to the same assignee as the present invention.

As described in more detail in the aforementioned application, the front door 16 of the oven toaster is linked to the carriage 3 so that movement of the carriage 3 in a forward direction will result in opening the front door, and correspondingly pivotal movement of the front door in a door opening direction will result in forward movement of the carriage 3 including the food rack 4 through the front opening 14 of the oven toaster. To achieve this, two door links 50 and 52 are conveniently pivoted to the front door and to forward pins 34 on the carriage links 26 and 28. Thus, it can be appreciated that when the door is manually opened by pulling on its front handle 20 the door will swing downwardly about its pivots and during this movement the door links 50 and 52 will pull outwardly on the pins 34 to slide the carriage 3 including links 26 and 28 and the food rack 4 out of the front opening 14 of the toaster. It can also be appreciated that when the door is manually closed the carriage links 26 and 28 are moved from their forward position illustrated in FIG. 1 to their generally rearward position illustrated in FIG. 3. Thus, when the door 16 is opened the carriage links 26 and 28 and the carriage 3 are moved forwardly, and when the door is closed the carriage links 26 and 28 are moved rearwardly.

The controls for the oven toaster are mounted at the side of the oven toaster, and a primary manual setting member 60 and a toast brownness control knob 62 extend through a front plate 64 of the toaster so that they may be readily operated from the front of the oven toaster.

The components of the control mechanism are supported by the sheet metal side plate 32 and are positioned about the forwardly and rearwardly movable carriage link 28 which is moved forwardly when the door 16 is opened and rearwardly when the door is closed. Thus, the carriage link 28 may be utilized to prevent energization of the heating elements 22, 23, 24 and 25 when the door is in its opened position illustrated in FIG. 1. To achieve this, an outwardly extending lug 68 may be riveted to the carriage link 28, and a sleeve bearing 70 may be positioned over the lug 68 for moving an arm 72 of a main switch actuating lever 74 to open a main switch 40 when the door 16 is opened.

MAIN SWITCH

Figure 3:
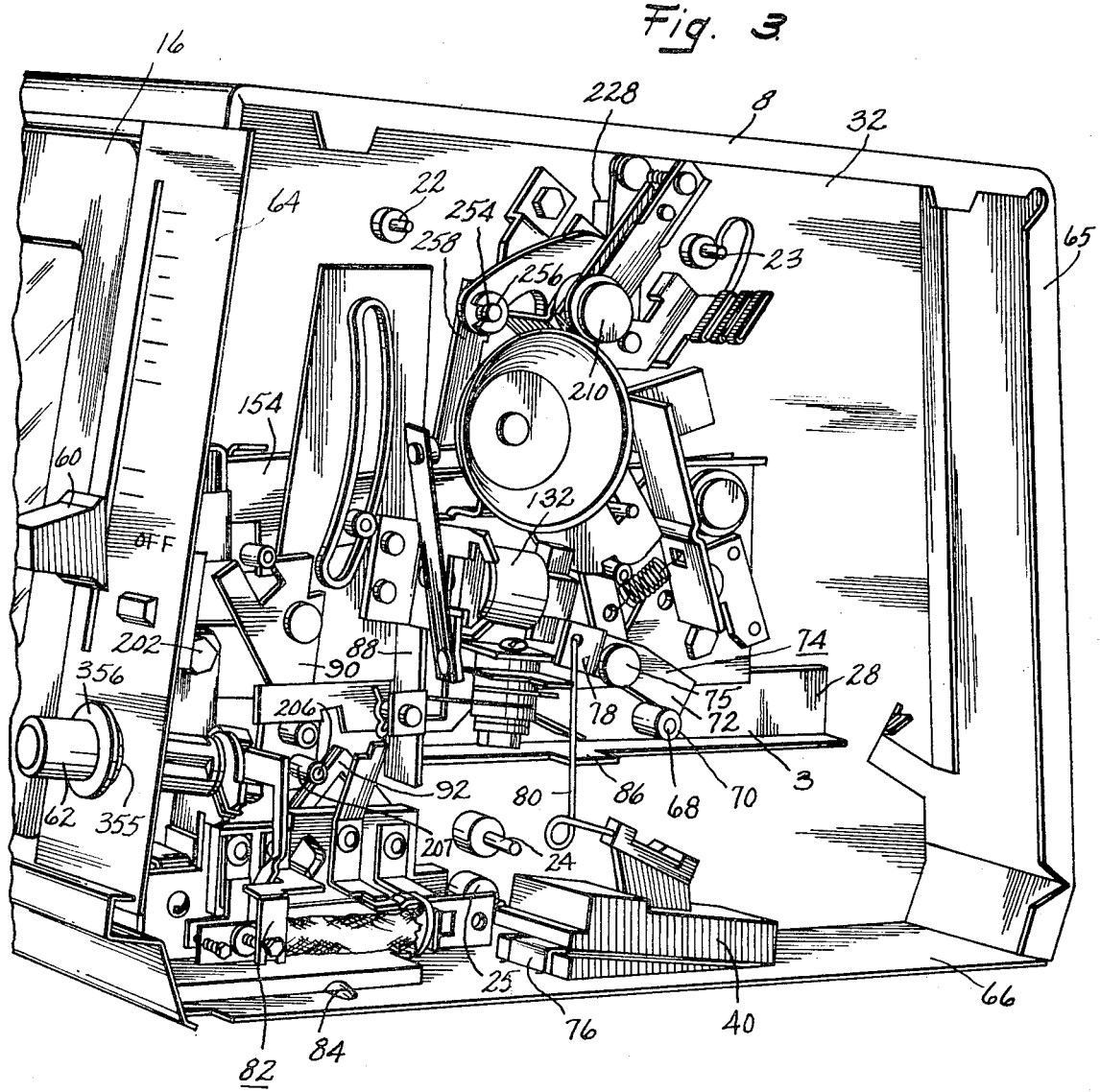
FIG. 3 is a right-side perspective view of the oven toaster shown in FIG. 1 with a right-outside wall of the oven toaster removed in order to show details of my improved timer mechanism.

With particular reference to FIG. 3, the main switch 40 of the oven toaster may be readily mounted on the generally horizontal bottom wall 66 of the sheet metal side plate 32 by tab 76 which may be struck from the bottom wall 66 of the plate 32. The switch is shown in cross section in FIGS. 4, 5 and 6 and diagrammatically in FIG. 2. With this construction, it can be appreciated that downward movement of the left arm portion 78 of the switch actuating lever 74 will move a spring wire switch actuating lever 80 downwardly to cause a cam member 83 to be rotated to lift switch blades 44 until contacts 48 abut contacts 51 to thereby close the main switch 40. The details of the main switch 40 do not form a part of my invention and are described and illustrated in greater detail in my prior U.S. Pat. No. 3,529,534, assigned to the same assignee as the present invention.

OVEN THERMOSTAT

A thermostat 210 is mounted on side plate 32 of the oven toaster for controlling energization of the heating elements 22, 23, 24 and 25 when the oven toaster is being operated as an oven. The details of the oven thermostat 210 do not form a part of my invention and are claimed and described in greater detail in a co-pending application of Harold DeRemer, Ser. No. 165,204, filed July 22, 1971, and assigned to the same assignee as the instant invention.

In the embodiment illustrated, the thermostat 210 is positioned at the upper portion of the sheet metal side plate 32 above the carriage link 28 and the primary manual setting mechanism 60–154 so that it may be readily controlled by the primary manual setting mechanism and the toaster carriage link 28.

Figure 7:
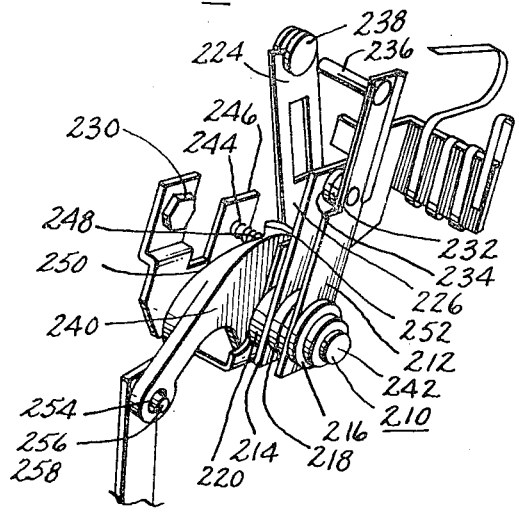
FIG. 7 is a perspective view of the oven thermostat of the control mechanism of the oven toaster shown in FIG. 3 illustrating the thermostat in its OFF position.

As shown in FIGS. 7, 8 and 9, thermostat 210 includes a stack of insulating disks 216, 218 and 220 for spacing two switch blades 212 and 214 and a mounting bracket 222. The mounting bracket 222 is generally U-shaped and includes a relatively rigid portion 221 which may be connected to the side plate 32 of the oven toaster by a screw 230 or other suitable securing means. As shown in FIG. 9, a bimetal blade 224 is connected to an arm 226 of the mounting bracket by a rivet, and as shown in FIG. 3, it is positioned adjacent to an aperture 228 which may be formed in the upper portion of the sheet metal side plate 32 for sensing the temperature within the oven chamber 15. The switch blades 212 and 214 are normally spring biased toward each other to close contacts 232 and 234 which are connected to the end portions of the switch blades, respectively.

An elongated actuating pin 236 is fixed to switch blade 212, and a ceramic insulator 238 is fixed to the end of the thermostat bimetal 224 for permitting the bimetal to open the switch contacts 232 and 234 upon an increase in temperature. Since the bimetal 224 is mounted in good heat exchange relationship with the oven toaster through the aperture 228 which is formed in the sheet metal side plate 32, an increase in temperature within the oven will cause the bimetal 224 and the insulator 238 to move to the right as shown in FIG. 8 to abut pin 236 to move it and switch blade 212 to the right to open contacts 232 and 234.

A cam mechanism is provided for manually adjusting the relative position of the switch blades 212 and 214 to the bimetal 224 for varying the temperature setting of the oven thermostat and for preventing operation of the oven thermostat 210 while the oven toaster is being operated by the toaster timer 82 as a toaster. As shown more particularly in FIG. 7, the cam mechanism includes a generally curved piece of phenolic material 240 which is rotatably mounted on a shaft 242 which extends through the fixed end portions of the switch blades 212 and 214, and the ceramic insulators 216, 218 and 220. The cam 240 changes the thermostat settings by physically moving the entire switch blade assembly 212 and 214 away from the bimetal blade 224. To achieve this, a screw 244 or other suitable projection may be connected to an arm 246 of the thermostat bracket 222 for cooperating with a cam surface which may be conveniently formed on the phenolic cam 240. As shown, the cam 240 includes a rather pronounced depression 248, a gently curved portion 250 which extends toward the sheet metal side plate 32 and to the left as shown in FIG. 7, and a steep cam surface 252 which extends upwardly from the depression 248. In addition, the bracket 222 includes a relatively thin flexible portion 223 which extends from the ceramic insulators 216, 218 and 220 to a relatively rigid portion 221 which is connected to the side plate 32.

With this construction, it can be appreciated that when the screw projection 244 is in the notch 248, the thermostat is in its lowest temperature setting since the actuating pin 236 is in its closest position to the insulator 238 of the bimetal. As the cam 240 is rotated clockwise from the position illustrated in FIG. 7, the generally smooth cam surface 250 of the cam 240 will slide on the end of the projection 244 to permit the entire switch blade assembly 212 and 214 to pivot about the flexible portion 223 of the bracket to gradually move the entire switch blade assembly 212 and 214, and particularly the projection 236 further away from the ceramic insulator 238 of the bimetal to thereby increase the temperature setting of the thermostat. Thus, in order to open the switch contacts 232 and 234 upon an increase in the temperature in the oven, the bimetal 224, and the insulated button which is positioned at the end of the bimetal will have to be moved a greater distance. Accordingly, the oven temperature setting is increased as the cam member 240 is rotated clockwise from the position illustrated in FIG. 7 to the position illustrated in FIG. 8.

The highest cam surface 252 of thermostat cam 240 is utilized for preventing operation of the thermostat 210 when the oven toaster is being operated as a toaster. It can be seen that when the cam 240 is rotated a relatively short distance counterclockwise from the position illustrated in FIG. 7 to the position illustrated in FIG. 9, the end of projection 244 will be placed at the highest point 252 on cam 240 to permit the entire switch blade assembly 212 and 214 to be moved a relatively great distance away from bimetal 224. The spacing is so great in this position that upon an increase in temp. within the cooking chamber 15 the insulator 238 of bimetal 224 cannot contact the projection 236 before the toaster timer 82 terminates the toasting cycle.

Figure 6:
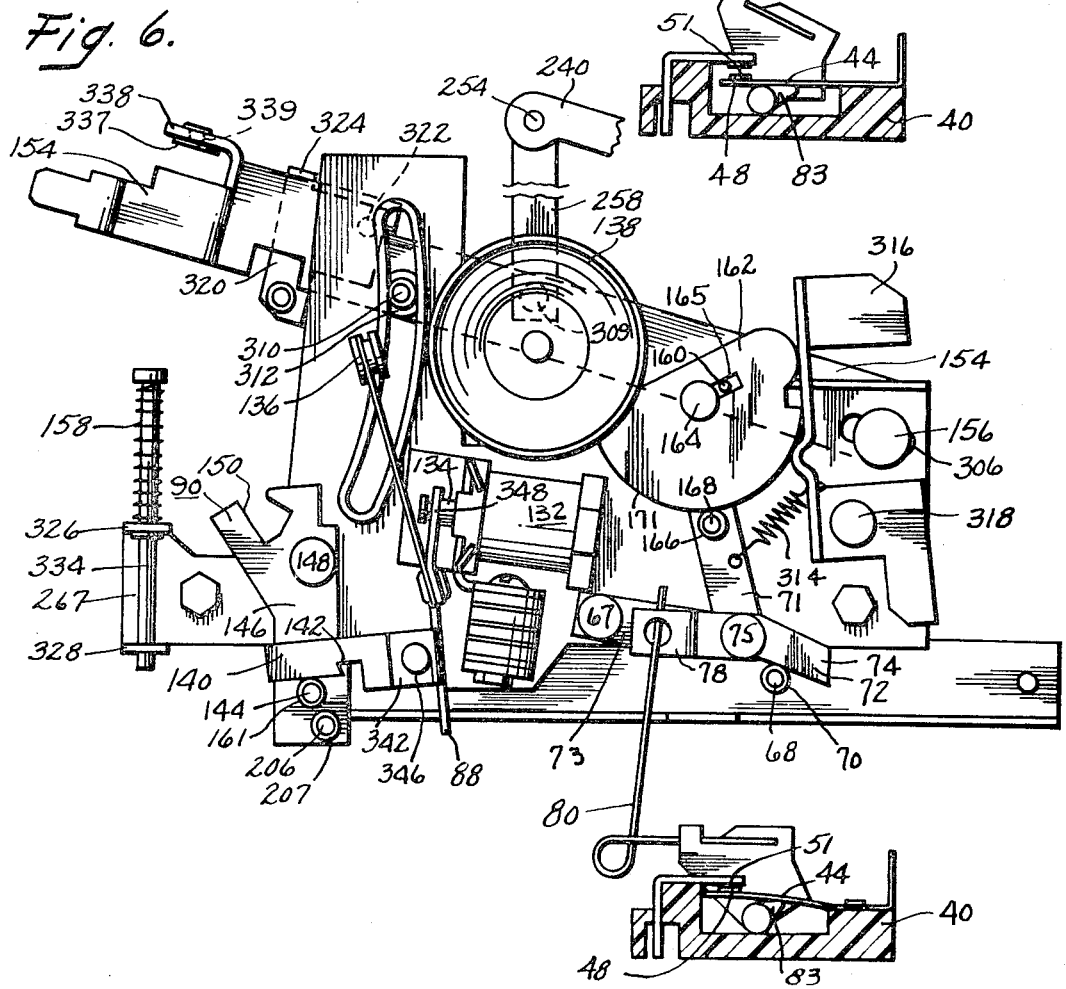
FIG. 6 is a fragmentary side elevational view similar to FIG. 4 showing the positions of the parts when the oven toaster is being used as an oven.

The primary manual setting mechanism includes a linkage or manually varying the relative position of the thermostat cam 240 to the screw projection 244. As shown more particularly in FIGS. 3, 6 and 8, an aperture 254 is form in an end portion of the cam 240 for receiving a pivot pin 256 which may be passed through an end of a link lever 258. As shown in FIG. 6, the other end of the link lever 258 is pivoted to a generally central portion of my primary manual setting lever 154 by means of a pivot pin 309. Thus, the oven temperature setting may be readily adjusted by simply manually moving the push button 60 upwardly or downwardly across the front wall 64 of the oven toaster. It can be appreciated that as the push button is lifted, the primary manual setting lever 154 will be pivoted clockwise about its pivot 306 to lift the link lever 258 which in turn pivots the thermostat cam lever 240 in a clockwise direction about its shaft 242. This movement will result in a slidable movement of the smooth surface 250 of the cam 240 on the end of the screw 244 to cause the switch blade assembly 212 and 214 to be moved further and further away from the insulated button 238. Thus, the oven temperature setting is increased as the push button 60 is lifted along the front wall 64 of the oven toaster.

CIRCUIT DIAGRAM

The circuit for the oven toaster is illustrated in FIG. 2. As shown, it includes thermostat 212-214 for controlling energization of the heating elements 22, 23, 24 and 25 when the oven toaster is being operated as an oven, my unique heat-up cool-down bimetal timer 82 for timing a toasting cycle when the oven toaster is being operated as a toaster, a solenoid 132 for opening a main switch 40 at the end of a toasting cycle, a function switch 262 and shunt resistor 260 for permitting a limited amount of current to flow to the bimetal heater 106 to provide a limited amount of current to preheat the bimetal when the oven toaster is being operated as an oven, and an indicator lamp 296 for indicating that the main switch 40 has been closed and that power is being supplied to the appliance.

When it is desired to operate the oven toaster a an oven, the main switch 40 should be closed, the function switch 262 should be closed, he heat-up cool-down bimetal timer should be prevented from energizing the solenoid 132 to open the main switch, and the actuating pin 236 on switch blade 212 of the thermostat should be placed in relative close proximity to the insulator button 238 of the thermostat bimetal 224 to permit the thermostat switch 232 and 234 to regulate the temperature within the oven.

When it is desired to operate the oven toaster as a toaster, it can be seen that the main switch 40 should be closed, the function switch 262 should be opened to permit full current to flow through the bimetal heater 106 of the heat-up cool-down bimetal timer, and the bimetal timer 82 should be placed in its operative position wherein switch blade 110 is allowed to move upwardly at the end of the bimetal heat-up cycle to place the switch contacts of the bimetal heat-up cool-down timer in their cool-down position with switch contacts 108 and 109 open and switch contacts 116 and 118 closed. Moreover, the oven thermostat should be moved to the position illustrated in FIG. 9 wherein the set screw projection 244 is placed on the highest surface 252 of the thermostat cam for camming the thermostat switch blades 212 and 214 far away from the bimetal insulator button 238 to prevent the bimetal 224 from controlling the temperature within the oven toaster.

FUNCTION SWITCH ARRANGEMENT FOR HEATING

TOASTER TIMER DURING OVEN OPERATION

Figure 18:
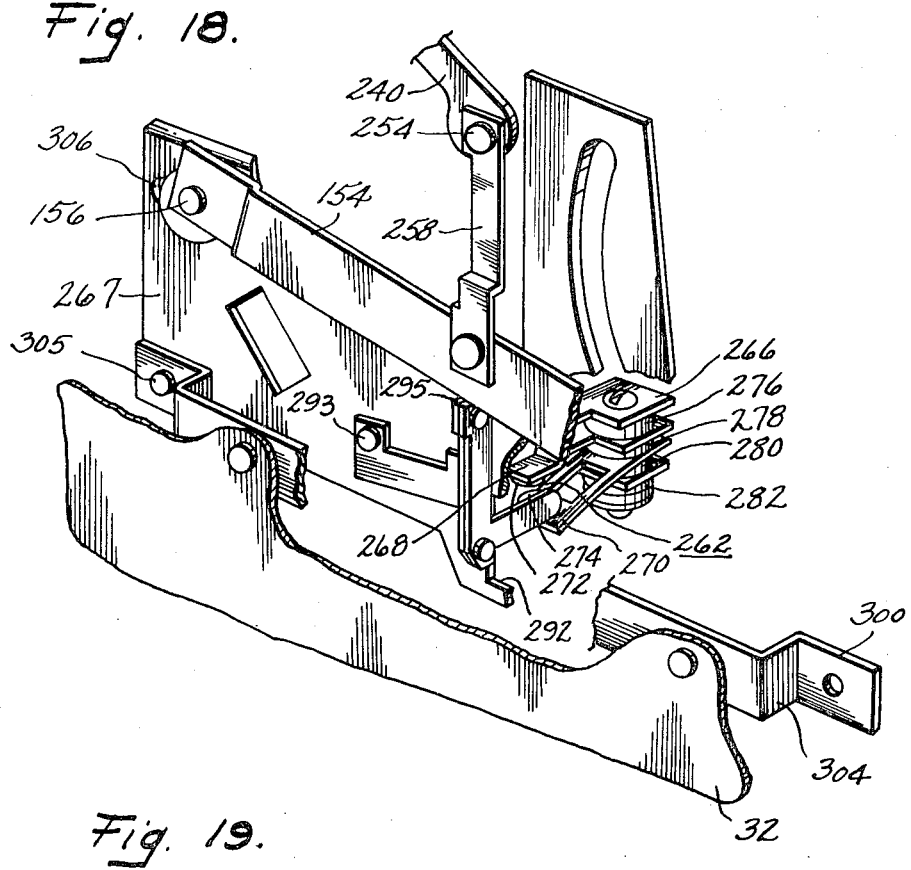
FIG. 18 is a fragmentary side perspective view of a function switch mechanism of the toaster control mechanism of the oven toaster shown in FIG. 3 showing the positions of the parts during a toasting cycle with the function switch in its open position.

The heat-up cool-down bimetal timer 82 is calibrated so that in spite of the fact that it takes less time to toast a slice of bread after the toasting chamber has been warmed by a prior toasting cycle, it will toast the next succeeding slice of bread to the same degree of brownness without changing the toast setting on knob 62. To achieve this same effect after a prior oven operation, the heat-up cool-down bimetal timer is heated to the same degree that it would be heated by a preceding toast cycle. As shown in the circuit diagram illustrated in FIG. 2, a shunt resistor 260 and a function switch 262 are positioned in a circuit between the main switch 40 and the upper blade 112 of the bimetal heater switch 108. The shunt resistor 260 is of approximately 5 ohms, and with this arrangement when the push button 60 is moved from its middle "OFF" position upwardly to one of the oven temperature settings the function switch 262 is permitted to close by the upward movement of an insulated tab 264 which is operated by the push button control lever 154, as shown in FIG. 18. Conversely, when the push button 60 is moved downwardly from its neutral "OFF" position the insulated tab 264 moves a switch blade 270 of the function switch 262 downwardly to thereby open the switch 262 and remove the resistance 260 from the circuit to the bimetal heater 106. By this unique arrangement the heat-up cool-down bimetal timer 82 may be readily preheated to the desired amount by simply adding a shunt resistor 260 and a function switch 262 to the circuitry for the oven toaster.

The mechanism for closing and opening the function switch 262 is achieved at a relatively low cost by the use of an insulated tab 264 which may be readily operated by the push button lever 154 which also controls energization of the main switch.

Figure 15:
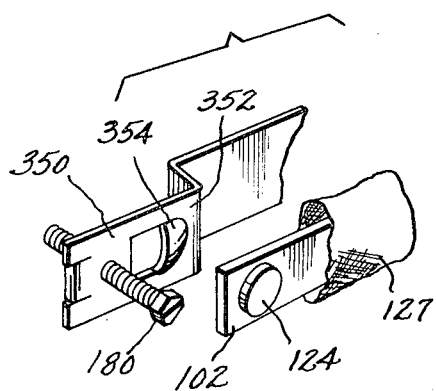
FIG. 15 is an exploded fragmentary view of the free end portions of the heat-up cool-down bimetal and the bimetal control member shown in FIG. 10.

As shown more particularly in FIG. 18, the function switch 262 may be conveniently mounted on a bracket 266 which is fixed to a sheet metal mounting plate 267 for my primary manual setting mechanism. As illustrated, the function switch includes two switch blades 268 and 270 having contacts 272 and 274 mounted at the ends of the blades, respectively. A suitable stack of the ceramic insulators 276, 278 and 280 are positioned between and on opposite sides of the switch blades 268 and 270 in order to insulate the blades from the bracket member 266. The assembly also includes insulator 282 and terminals 286 and 288 to provide appropriate connection means for the circuitry illustrated in FIG. 2. As shown in FIG. 15, the insulated tab 264 extends through an aperture 292 which is formed in the sheet metal mounting plate 267. The tab 264 is connected to a lever 294 which is pivoted to the mounting plate 267 by a suitable rivet 293. As shown, the lever 294 includes an upper surface 295 for engagement with a lower surface of the primary manual setting lever 154.

With particular reference to FIG. 18, it can be appreciated that the lower switch blade 270 is wider than the upper blade 268 and it extends forwardly from the upper blade 268 for enabling the insulated tab 264 to operate the switch. With this construction, when the lower surface of the push-button lever 154 is positioned up and away from the surface 295 of the function switch lever 294, the resiliency of the lower switch blade 270 moves the lower switch blade 270 upwardly against the force of the insulated tab 264 and its lever 294 to close the function switch 262. Conversely, when the push button 60 is depressed to lower the push-button lever 154 to the toast position illustrated in FIG. 4, the lower surface of the lever 154 abuts the upper surface 295 of the function switch lever 294 to lower the lever 294 and the insulated tab 264 which is attached to the lever to move the lower switch blade 270 downwardly to open the function switch 262.

PRIMARY MANUAL SETTING MECHANISM

There is combined with my improved heat-up cooldown bimetal timer 82 and the oven thermostat 212 a primary manual setting mechanism including a lever 154 and latch construction 90 for moving and holding the control components in a plurality of oven temperature positions, an off position, or a toast position. As shown more particularly in FIGS. 4, 5 and 6, the primary manual setting mechanism includes a sheet metal plate 267 which is positioned between the oven thermostat 212-214 and the toaster carriage link 28. It is held spaced away from the sheet metal side plate 32 of the oven toaster by means of a bracket 300 which may be riveted or otherwise secured to the sheet metal side plate 32. The bracket 300 includes two outwardly extending arms 302 and 304, and the sheet metal mounting plate 267 of the manual setting mechanism may be connected to the bracket 300 by means of screws 305 or other suitable securing means.

The mounting plate 267 includes a generally horizontal short pivot slot 306 and a generally vertical elongated slot 308 for mounting my unique push-button lever 154. As shown, a rivet 156 having a head portion 157 is fixed to one end of the push-button lever 154 for pivotally mounting the lever at the slot 306. It can be seen that the lever 154 is positioned on one side of the mounting plate 267 in the vicinity of the pivot slot 306 while the head 157 of the rivet is positioned on the other side of the mounting plate 267. Thus, the rivet 156 which is fixed to the push-button lever 154 can rotate and slide within pivot slot 306 as the push-button lever 154 is raised and lowered.

In order to smoothly guide the push-button lever 154 as it is rotated within its pivot slot 306, a pin 310 is staked to a central portion of the lever 154 for holding a roller 312 which is received within the vertical slot 308.

The primary manual setting mechanism also includes the link lever 258 for controlling operation of the thermostat cam 240 which is pivotally mounted on a central portion of the push-button lever 154 by a rivet 309. As shown, the upper portion of the lever 258 is provided with an outwardly extending pin 256 for receiving an aperture 254 which is formed in the end of the cam lever 240.

As generally indicated in the foregoing discussion, the primary manual setting mechanism and particularly the push-button lever 154 operates a mechanism for opening and closing main switch 40. As shown more particularly in FIGS. 4, 5 and 6, this main switch operating mechanism includes a rotatable cam 162 which is pivotally mounted on the primary manual setting mechanism mounting plate 267 by means of a rivet 164. The cam is generally circular in shape and it includes a slot 165 for receiving a drive pin 160 which is fixed to and extends outwardly from the push-button lever 154. With this construction, it can be appreciated that upward and downward pivotal movement of the push-button lever 154 will rotate the cam 162 in a clockwise or counterclockwise direction about its pivot 154. It can be seen that upon upward movement of the push-button lever 154, the pin 160 will abut an upper right surface of the slot 165 to move the cam 162 in a counterclockwise direction. Conversely, downward movement of the push-button lever 154 will cause the drive pin 160 to abut the opposite surface of the slot 165 to cause the cam 162 to be rotated in a clockwise direction.

Figure 5:
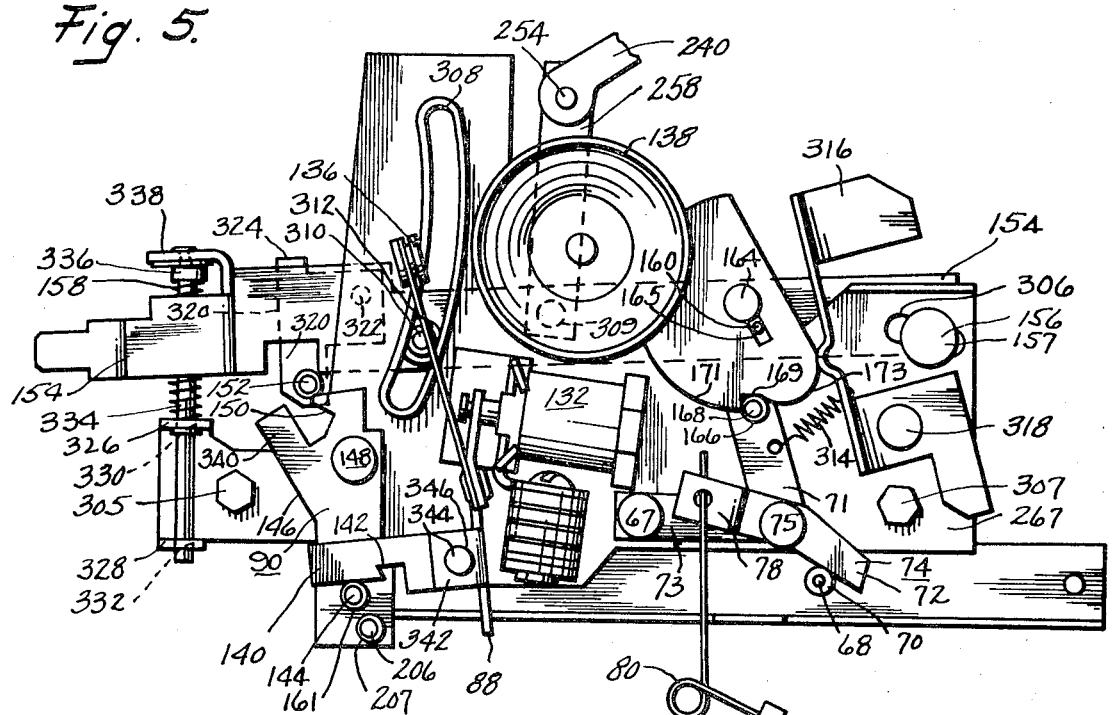
FIG. 5 is a fragmentary side elevational view similar to FIG. 4 showing the OFF position of the parts at the termination of a toasting cycle.

The cam 162 is provided with an off notch 169 and raised cam surfaces 171 and 173 on opposite sides of the off notch for controlling actuation of the main switch actuating levers 74, 76 and 80. With particular reference to FIG. 5, it can be appreciated that when a detent lug 166 of the switch actuating levers is positioned in the off notch the main switch 40 is in its open position. When the wire switch actuating lever 80 is moved downwardly the switch is closed, and when it is allowed to move upwardly the switch is moved to its open or off position illustrated in FIG. 5.

A switch actuating lever mechanism 71-73, and 74-78 is positioned between the cam 162 and the wire actuating lever 80. As shown, the mechanism includes an intermediate lever 71-73 which is pivotally mounted at 75 to the primary manual setting mechanism support plate 267, and an actuating lever 74-78 which is pivotally mounted to the intermediate lever 71-73 by means of a pivot 75.

A cam lever 316 is provided for cooperating with cam 162 to resiliently urge the cam 162 in a clockwise or counterclockwise direction. As shown, a spring 314 is positioned between the upper vertical arm 71 of the intermediate lever and the cam lever 316, and the lever 316 may be conveniently pivoted to the support plate 267 by means of a pivot 318. With this construction, the spring 314 which normally holds detent 166 into the off notch 169 of cam 162 also urges lever 316 to the left.

The primary manual setting mechanism also includes a latch and lever arrangement for holding the lever 154 in the toast position illustrated in FIG. 4 with the main switch 40 closed until the heat-up cool-down bimetal timer 82 has completed a cycle of operation and it is desired to automatically open the main switch. As shown in FIG. 4, the mechanism includes a latch lever 90 which may be pivotally mounted at 148 to the support plate 267. A hook latch portion 150 is formed above the pivot 148 for gripping a pin 152 to hold the push-button lever 154 in the toast position illustrated in FIG. 4. As shown, the latch pin 152 is fixed to a lever 320 which may be suitably pivotally mounted on forward portion of the push-button lever 154 by a pivot pin 322. The lever 320 is provided with an upper projecting portion 324 for normally holding the lever and the detent pin 152 in the position illustrated in FIG. 6 with the projection 324 resting on the upper surface of the latch lever 154.

With particular reference to the TOAST position shown in FIG. 4 and the OFF position illustrated in FIG. 5, it can also be appreciated that the push-button lever 154 is normally spring urged to the OFF position by the spring 158 which moves a tab 338 of lever 154. As illustrated in FIGS. 4, 5 and 6, two tabs 326 and 328 are integrally formed with the mounting plate 267. They extend outwardly from the mounting plate, and apertures 330 and 332 are formed in each of the tabs 326 and 328, respectively, for receiving a slidable rod and plunger member 334. As shown, plunger 334 includes a head portion 336, and the spring 158 is positioned between the head 336 of the plunger and the upper surface of tab 326.

The upper surface of the head of the plunger 334 is arranged for cooperation with the outwardly extending tab 338 which is integrally formed with the push-button lever 154. In order to provide smooth gliding contact between the head 336 of the plunger 334 and the tab 338, a plastic button 337 may be positioned on the lower surface of tab 338. As illustrated in FIG. 6, a reduced diameter potion 339 of the button 337 may extend through an aperture which is formed in tab 33 for connecting the button to the tab.

With this construction, it can be seen that the push-button lever 154 is moved downwardly so that the lower surface of the button 337 abuts the top of head 336. As shown in FIG. 5, spring 314 is urged into the off notch 169 of the cam 162 to rotate the cam 162 in a clockwise direction to move its drive pin 160 and the push-button lever 154 to which it is attached downwardly, gravity urges the lever 154 downwardly, and spring 80 also urges the lever 154 downwardly until the lower surface of tab 338 abuts the head of plunger 336. The spring 158 acting between the head 336 of the plunger and the upper surface of tab 326 prevents further downward movement of the tab 338.

In order to limit upward movement of the plunger 334, a "C" washer 340 may be snapped onto a groove formed in the plunger. As shown in FIG. 5, the upper surface of the "C" washer cooperates with a lower surface of tab 326 to limit upward movement of the plunger 334 under the influence of spring 158.

The previously mentioned solenoid-operated latch 140–142 is also pivotally mounted on my primary manual setting mechanism mounting plate 267. As shown, the solenoid-operated lever and latch includes a generally vertical lever portion 88 and a generally horizontal latch lever portion 140. A tab 342 extends from the major portion of the solenoid lever 88 and is arranged generally parallel to the latch lever 140 for sorting the latch lever 140 and the solenoid lever 88 on a shaft 145. As shown, the latch lever 140 and the tab 342 are provided with apertures 344 and 346, respectively, for mounting the solenoid lever 88 and its integrally formed latch lever portion 140 on the shaft 145 which may be fixed to the mounting plate 267. The upper portion of the solenoid lever 88 includes a slotted portion 348 for connection with an axially movable plunger 134 of the solenoid 132. The plunger 134 of the solenoid is normally spring biased forwardly to pivot the solenoid lever 88 nd its latch lever 140 in a counterclockwise direction, and when the solenoid is energized by the flow of electric current through its coil the plunger 134 is moved inwardly against the force of the internal spring of the solenoid to pivot the solenoid lever 88 and its latch lever 140 in a clockwise direction about their common pivot shaft 145.

With this construction, it can be appreciated that when the push-button lever 154 is depressed from its OFF position illustrated in FIG. 5 to its TOAST position illustrated in FIG. 4, the tab 338 and its button 337 are brought into engagement with the upper surface of head 336 of the plunger 334 to move the plunger and the push-button lever 154 downwardly against the force of spring 158. Continued downward motion causes the lug 152 to be moved into engagement with the hook 150 of latch lever 90 to pivot latch lever 90 counterclockwise to move pin 144 into notch 142 of latch 140 to hold the push-button lever 154 in the TOAST position illustrated in FIG. 4 when the push button is released. This downward motion of the push-button lever 154 also moves the cam drive pin 160 downwardly to rotate the cam 162 from the OFF position illustrated in FIG. 5 to the TOAST position illustrated in FIG. 4 erin the detent lug 166 is moved from the off notch 169 downwardly onto the toast cam surface 173. This rotational movement of the cam 162 thus causes downward movement of the lug 166, clockwise movement of lever 71–73 abut pivot pin 67 and downward movement of the switch actuating lever 72–78. Thus, with the door 16 in its closed position so that lug 68 is in a position behind pivot 75 this downward movement causes the right side of lever 72–78 to abut lug 68 to cause counterclockwise movement of the lever 78 to move the spring switch actuating lever 80 downwardly to thereby close the switch.

Accordingly, it can be appreciated that when the primary manual setting mechanism is moved from its OFF position illustrated in FIG. 5 to its TOAST position illustrated in FIG. 4, lever 90 is latched in the position illustrated in FIG. 4 by he solenoid latch lever 88. With particular reference to FIGS. 3, 4, 11 and 12, it can be appreciated that lug 206 on lever 90 is provided for cooperating with my unique heat-up cool-down bimetal timer actuator 92 for permitting operation of the timer 82 to control a toast cycle when the push button 60 and lever 154 are moved to the TOAST position illustrated in FIG. 4.

HEAT-UP COOL-DOWN TIMER

In accordance with my invention, a unique heat-up cool-down bimetal timer 82 is provided for timing the toaster heating cycle. As shown in FIG. 3, the timer 82 is mounted on a lower generally horizontal wall 66 of the sheet metal side plate 32 by tabs 84 which may be readily truck upwardly from the relatively thin sheet metal side plate. As shown, the heat-up cool-down bimetal timer 82 is positioned below the forwardly and rearwardly movable carriage 28 so that the carriage 28 may prevent operation of the timer 82 when the door is moved to its opened position illustrated in FIG. 1. To achieve this, a tab 86 is integrally formed with the carriage 28 and extends outwardly from the carriage for cooperation with a solenoid latch lever 88 which in turn cooperates with the pivoted latch lever 90 of the primary manual setting mechanism which in turn cooperates with an actuator 92 of my heat-up cool-down bimetal timer to reset the timer 82 to its heat-up position when the door 16 is open.

The heat-up cool-down bimetal timer 82 is also uniquely constructed and specifically located below the latch lever 90 of the manual control mechanism so that when the manual control mechanism is moved from the OFF position illustrated in FIGS. 5 and 12 to the TOAST position illustrated in FIGS. 4 and 10, the lug 207 at the lower portion of the latch lever 90 can cooperate with my uniquely constructed and located bimetal timer actuator 92 to permit the timer to be moved into its heat-up cycle.

While the heat-up cool-down bimetal timer 82 and its actuator arrangement 92 form a part of my invention, the primary manual setting mechanism 154–90 does not form a part of my invention and is claimed and described in greater detail in the aforementioned copending application of Harold DeRemer, Ser. No. 165,204, filed July 22, 1971, assigned to the same assignee as the instant invention.

Figure 10:
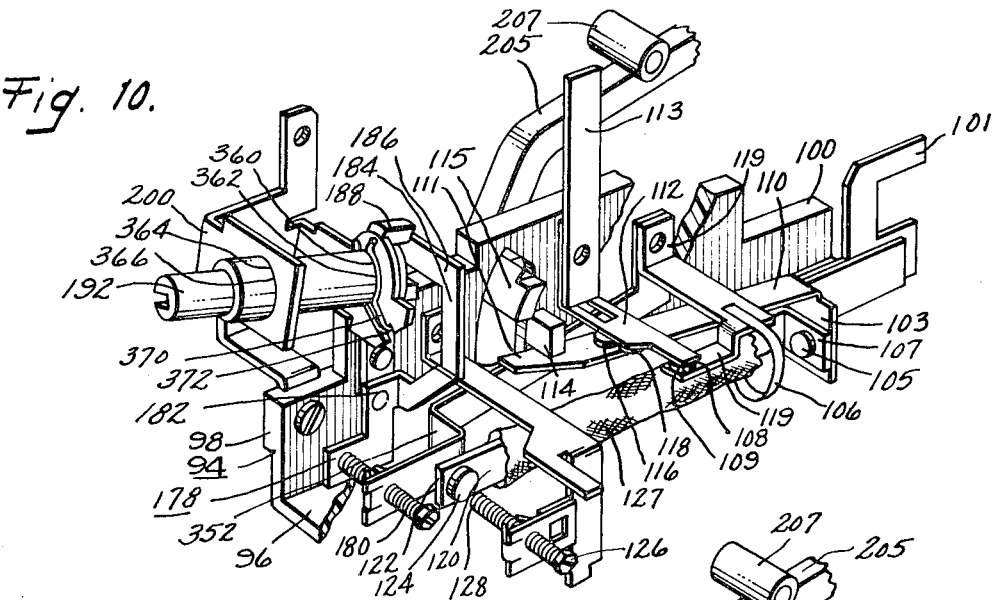
FIG. 10 is a perspective view of the heat-up cool-down bimetal timer shown in FIG. 3 showing the timer in its TOAST-BIMETAL HEAT-UP POSITION.

As shown in FIGS. 4 and 10, when the main oven toaster heater switch 48 has been placed in its closed position by the primary manual setting mechanism to start toasting a slice of bread, the heat-up cool-down bimetal timer 82 is also energized to control the duration of the toasting time interval. The bimetal timer supporting structure includes a generally L-shaped piece of phenolic 94 or other suitable insulating material. The phenolic support consists of a generally flat bottom wall portion 96 and a generally vertical wall portion 98. The vertical wall portion 98 includes an outwardly extending projection 100 for mounting a bimetal 102.

Figure 11:
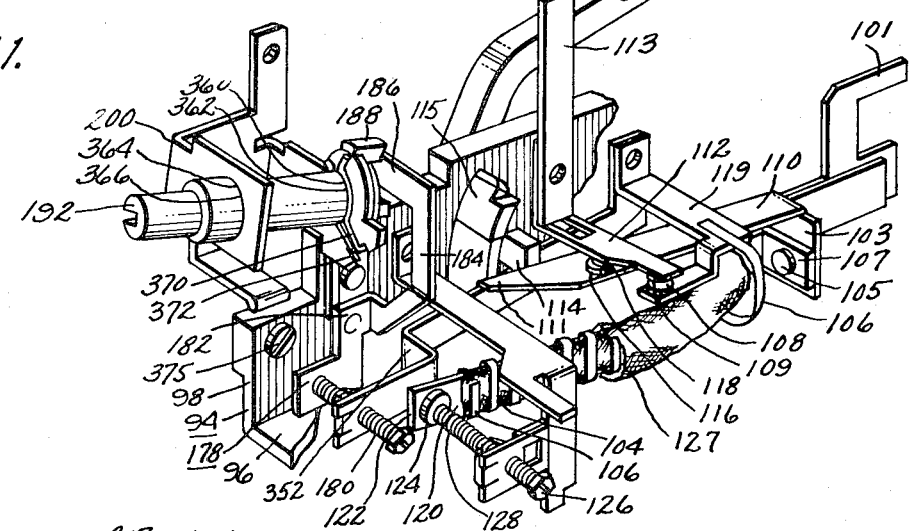
FIG. 11 is a perspective view of the bimetal toaster timer similar to FIG. 10 showing the timer in its TOAST-BIMETAL COOL-DOWN POSITION.
Figure 12:
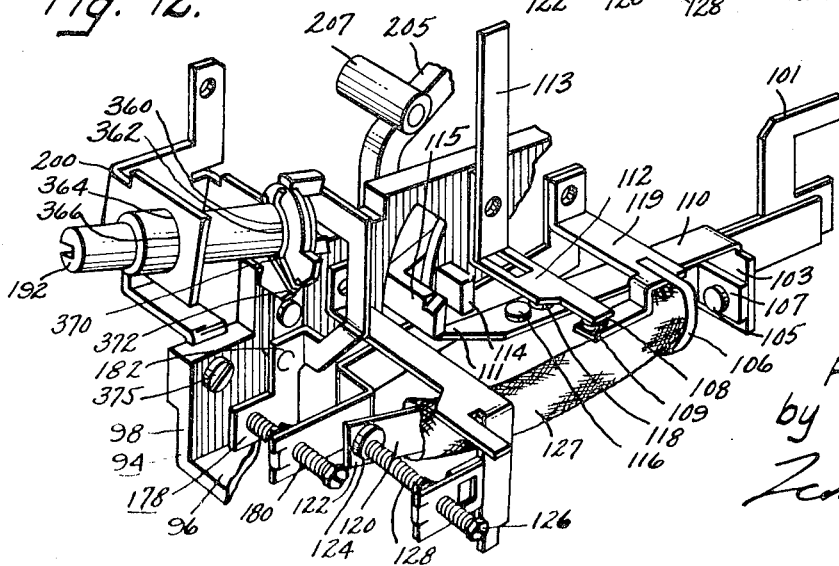
FIG. 12 is a perspective view of the bimetal toaster timer similar to FIG. 10 showing the position of the parts in the timer OFF position wherein the timer is prevented from being moved into its cool-down cycle.

As shown more particularly in FIGS. 10, 11 and 12, a switch blade and supporting member 110 is provided for connecting bimetal 102 to a bracket 101 and for mounting contact 116. The switch blade and mounting member 110 includes a generally vertical wall portion 103 for uniquely pivoting the bimetal. The wall portion 103 may be riveted at 105 to the bracket 101 which is secured to the insulating projection 100 which extends outwardly from the vertical wall of the timer body. The bimetal 102 includes a leg 107 arranged generally perpendicular to the major portion of the bimetal for connecting the bimetal to the outwardly extending wall portion 103. As illustrated, the bimetal 102 is arranged generally parallel to the vertical wall 98 and is spaced a short distance from it by the outwardly extending projection 100. Leaf spring member 110 is arranged generally perpendicular to the plane of bimetal 102 and is spring biased inwardly toward the vertical wall 98 of the timer body member and upwardly away from the bimetal 102. The leaf spring switch blade member 110 also includes a rear surface portion 111 for cooperation with an outwardly extending projection 114 which may be uniquely integrally formed with the vertical wall 98 of the timer body member.

With particular reference to FIG. 10 and 11, it can be appreciated that the contact 116 which forms one of the contacts of switch 116–118 is mounted on the upper surface of switch blade 110. The other contact 118 of switch 116–118 mounted on a switch blade 112. As shown in FIG. 10, the switch blade 112 is generally L-shaped and is sandwiched to the generally vertical wall 98 of the timer body member by means of a terminal piece of sheet metal 113. The switch blade 112 extends outwardly from the rear vertical wall 98 and, thus, it is arranged at an angle which is perpendicular to both the bimetal 102 and the switch blade 110. As shown more particularly in FIGS. 10 and 11, switch blade 112 includes a contact 108 which constitutes the upper contact of switch 108–109, and as shown the contact 108 is formed on the lower surface of switch blade 112.

The lower contact 109 of switch 108–109 is connected to the upper surface of a relatively rigid L-shape sheet metal bracket member 119. As shown, one of the legs of the bracket 119 is secured to the generally vertical wall 98 of the timer body member. One end of the bimetal heater wire 106 is welded or otherwise fixed to the upper surface of the sheet metal bracket member 119. A sleeve of insulating material 104 is positioned around the bimetal 102, the heater wire 106 is wrapped around the insulating material, the other end of the resistance wire 106 is suitably connected to the bimetal, and an outer sleeve 127 covers the bimetal heater to reduce external losses such as convection currents. Thus, the bimetal itself is electrically hot and functions as a terminal for one end of the bimetal heater wire 106. With this construction, switch 108 and 109 controls energization of the bimetal heater, and it is in a closed position, as shown in FIG. 10, when the switch blade 110 is held away from a switch blade 112 by the lug 114 which is integrally formed with the upper vertical wall 98 of the bimetal phenolic support.

As the bimetal 102 is heated by the bimetal heater 106, the bimetal itself bows away from the vertical wall 98 of the phenolic insulating plate, i.e., the central portion of the bimetal tends to move outwardly and the end portions of the bimetal are forced inwardly. After the bimetal has been heated to a predetermined amount, blade 110, it is moved away from the vertical wall 98 of the phenolic support until it is unrestricted by the projection 114. At that instant, as shown in FIG. 11, the leaf spring switch blade 110 moves upwardly under its spring force to move contact 116 on the switch blade 110 into contact with a contact 118 on switch blade 112 to lift switch blade 112 to thereby open switch contacts 108 and 109 to de-energize heater 106 to permit the bimetal 102 to cool down. As the bimetal cools down it tends to straighten out and the end portions which had been urged toward the vertical wall 98 now move away from the vertical wall, particularly the free end portion 120 used as a switch blade 122 which moves away from the vertical wall member 98. Upon continued movement in this direction, a switch contact 124 will abut an end 128 of screw 126 to close a solenoid switch 124 and 128 which signals the termination of the bimetal timer cool-down cycle.

In accordance with my invention, a unique timer actuator member 92 is provided for permitting or preventing operation of the heat-up cool-down bimetal timer by controlling the operability of switch blade 110. The timer 82 is prevented from operating by holding the switch blade 110 down as shown in FIG. 12 which prevents movement of the switch blade 110 up to the bimetal cool-down position illustrated in FIG. 11 wherein it would open the contacts 108 and 109 to the bimetal heater 106.

The timer actuator 92 includes an upwardly extending wall 205 which is arranged in the path of a lug 206–207 which is formed on lever 90 of my unique primary manual setting mechanism. It can be appreciated that movement of the lug 206 and 207 rearwardly from the position illustrated in FIG. 12 to the position illustrated in FIG. 10 will move the phenolic actuator 92 clockwise about its pivot 204 to thereby lift lug 115 to permit a full cycle of operation of the heat-up cool-down bimetal timer 82. Thus, after the bimetal 102 has been heated sufficiently, the switch blade 110 may be moved out from under the fixed lug member 114 to permit upward movement of switch blade 110 to close switch contacts 116 and 118 and open contacts 108 and 109 to thereby interrupt the flow of current to the bimetal heater wire 106 to allow the bimetal to operate in its cool-down cycle.

Figure 16:
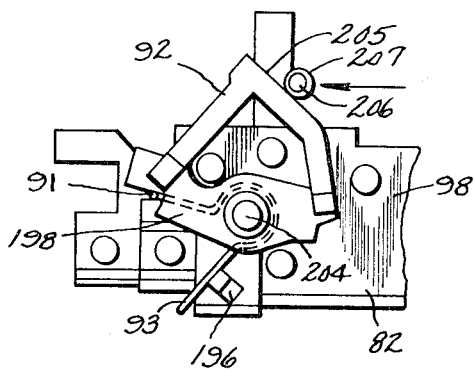
FIG. 16 is a fragmentary left-side elevational view of the timer shown in FIG. 10 showing the position of the on-off actuator of the timer in the timer off position wherein the timer is prevented from being moved into its cool-down position.
Figure 17:
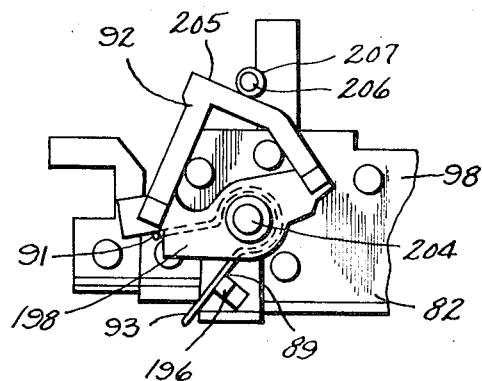
FIG. 17 is a side elevational view similar to FIG. 16 showing the timer actuator in its on position wherein the timer is allowed to move from its bimetal heat-up position into its bimetal cool-down position.

As shown more particularly in the FIGS. 16 and 17 rear views of the bimetal timer 82, the actuator 92 is preferably formed of phenolic plastic and is pivoted about a shaft 204 which may be connected to the generally vertical wall 98 of the timer body. As shown, the timer actuator 92 includes a lower arm 198 for receiving pivot shaft 204 and the upper slide arm portion 205 which is uniquely shaped and arranged in the path of lug 206–207 which is formed on latch lever 90 of the primary manual setting mechanism.

The actuator 92 of the heat-up cool-down bimetal timer is normally spring urged clockwise to the position illustrated in FIG. 16 by a spring 93. As illustrated, the spring 93 is looped around the shaft 204 of the actuator. One end of the spring is held by a lug 196 which may be integrally formed on the rear surface of the vertical wall 98 of heat-up cool-down bimetal timer body while the other end 91 of the spring abuts a lower surface of the arm 198 of the actuator member to urge the actuator 92 in a clockwise direction as shown in FIGS. 16 and 17.

As shown more particularly in FIGS. 10, 11 and 12, the actuator 92 includes an integrally formed lug 115 which extends through a slot 125 which may be formed in the generally vertical wall 98 of the timer body for moving switch blade 110. As shown more particularly in FIG. 12, when the lug 207 is spaced from actuator 92, spring 93 of the actuator rotates the actuator and its lug 115 in a counterclockwise direction as viewed in FIG. 10, 11 and 12 to move the switch blade 110 downwardly to open contacts 116 and 118 and to close contacts 108 and 109. Thus, it can be appreciated that when the actuator 92 holds the contacts 116 and 118 in their open position the heat-up cool-down bimetal timer is prevented from automatically moving into its cool-down cycle, the cool-down cycle being initiated by the closure of contacts 116–118 and the opening of contacts 108 and 109. In other words, the lug 115 on the actuator 92 extends inwardly beyond lug 114 so that no matter how far the bimetal heater 106 moves the switch blade 110 from the vertical wall 98, it cannot be moved beyond the movable lug 115 to open the bimetal heater switch 108 and 109.

It can be appreciated that the natural upward bias force on leaf spring 110 is greater than the downward spring bias of leaf spring 112. Accordingly, when both spring blades are free to move under their built-in bias, as shown in FIG. 11, the lower contact 116 on switch blade 110 abuts contact 118 to lift switch blade 112 against its natural downward bias to open contacts 108 and 109 and close contacts 116 and 118.

A switch blade member 122 is integral with the free end of bimetal 102 for supporting a contact 124 for energizing the solenoid 132 to open the main switch contacts 48–51 and unlatch lug 207 and its lever 90 from the upper surface 205 of the bimetal timer actuator 92 at the end of the cool-down cycle. Thus, at the end of a cool-down cycle spring 93 of the switch actuator 92 moves the actuator and its lug 115 to the position illustrated in FIG. 12 to hold the switch blade 110 in its lower timer reset position.

Figure 13:
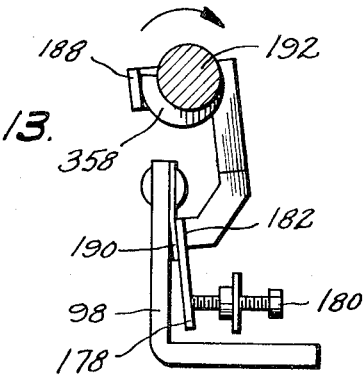
FIG. 13 is a fragmentary cross-sectional view of a portion of the color cam mechanism of my improved bimetal timer taken substantially along the line 13—13 of FIG. 10 showing the cam in its highest position for setting a light color or brownness of the toast desired by a user.

In accordance with my invention, the improved heat-up cool-down bimetal timer includes a unique arrangement for readily calibrating the duration of the heat-up cycle of the bimetal timer and the duration of the cool-down cycle of the bimetal timer. The mechanism for calibrating the timer during manufacture is also uniquely related to an improved mechanism for allowing a user to manually control the desired degree of brownness of the toast. Briefly, the color cam mechanism for manually setting the color and brownness of the toast desired by the user includes a cam follower plate 178 as shown in FIG. 13 which is moved toward or away from the generally vertical wall 98 of the timer body by a cam mechanism 192 to control the desired brownness of the toast. An adjusting screw 180 which is uniquely positioned on the heat-up cool-down timer is utilized to provide a manufacturing adjustment or calibration in the heat-up cycle of the bimetal timer.

My improved and reliable mechanism for controlling the heat-up time period of the bimetal includes a leaf spring blade bimetal control member 350 as shown in FIG. 15 for very accurately adjusting the pivot point of the left or free end of the bimetal 102 to thereby control the heat-up cycle of the bimetal. As shown more particularly in FIGS. 10 and 15, the bimetal control blade is positioned between the bimetal and the vertical wall 98 of the bimetal body. As shown in FIG. 10, its right end is fixed to the vertical wall of the control body, it extends closely adjacent to and generally parallel with the vertical wall 98 of the control body and it includes an L-shaped portion 352 which extends outwardly from the vertical wall. With particular reference to the exploded detail view shown in FIG. 15, the end portion of the bimetal control blade 350 includes a generally semivcircular bump 354 which functions as the pivot point for the free end of the bimetal 102. The calibration screw 180 is threaded through the end portion 352 of the bimetal control blade relatively close to the pivot 354 for providing a manufacturing adjustment in the distance of the pivot 354 from the cam follower blade 178 and the vertical wall 98 of the timer body. It can be appreciated that as the pivot 354 is spaced further from the vertical wall 98 of the timer body the heat-up time period is decreased since the bimetal 102 will be required to move a shorter distance to move the blade 110 a shorter distance from the position illustrated in FIG. 10 to the position illustrated in FIG. 11 to release the blade 110 from lug 114 to allow blade 110 to move blade 112 to open the contacts 108 and 109 for the bimetal heater. Thus, the manufacturing calibration of the distance of the pivot 354 from the vertical wall 98 of the timer body is adjusted by screw 180. An additional adjustment in this distance by a user of the appliance to achieve the desired color and brownness of the toast is made by rotating cam 192 to move the entire cam follower 178 further away from or closer to the vertical wall 98 of the timer body.

The arrangement for making a manufacturing calibration adjustment in the heat-up cycle of the bimetal timer is uniquely spaced and related to a mechanism for making a calibration in the cool-down time period of the bimetal timer. As illustrated more particularly in FIG. 11, the cool-down cycle is terminated when the solenoid switch 124 and 128 is closed. As illustrated, the contact 124 of the solenoid switch is fixed to the free end 122 of the bimetal while the other contact 128 of the solenoid switch is formed by the end of a calibration screw 126. With this construction, it can be appreciated that as the end 128 of the screw 126 is moved further away from the contact 124, the length of the bimetal cool-down time period is increased.

With this unique parallel arrangement of the heat-up calibration screw 180 very close to the cool-down calibration screw 126, the heat-up and cool-down time periods of the heat-up cool-down bimetal timer may be readily made during manufacture. It is significant that in making the manufacturing adjustments in the heat-up and cool-down cycles, it is not necessary to touch the bimetal blade itself which could cause errors due to deformation of the bimetal. Moreover, the end of the heat-up calibration screw 180 abuts the cam follower 178 which is very closely spaced to the vertical wall 98 of the timer body member. Thus, when a screwdriver is inserted within a slot of screw 180 and pressed toward the vertical wall 98 of the timer body, relatively great force can be applied to the screwdriver without deforming any of the critical components of the heat-up cool-down bimetal timer. By this arrangement, a very reliable and accurate manufacturing calibration may be made in my improved heat-up cool-down bimetal timer.

My improved toast color cam mechanism for manually setting the color and brownness of the toast desired by a user will now be more particularly described. In accordance with my invention, the entire toast color cam mechanism is attached to the timer body, and more particularly, only the vertical wall 98 of the timer body in order to minimize any changes in calibration due to the assembly of the front plate 10 of the oven toaster and other portions of the oven toaster. As shown more particularly in FIG. 3, the control cam 192 of the toast brownness control mechanism extends through a relatively large aperture 355 which is formed in the front wall 64 of the oven toaster for receiving the control cam 192. It can be seen that a control knob 62 and flange 356 may be readily attached to the end of the control cam 192 for covering the aperture 355.

As shown in FIGS. 10, 11 and 12, the toast brownness timer control and cam construction includes a timer cam follower plate 178 and an adjusting screw 180. These parts determine the pivot point of the left end of bimetal 102 and thereby cooperate to set the time when the switch 108 and 109 de-energizes the bimetal heater 106 to thereby determine the time interval of the heat-up cool-down bimetal 102 and the toasting cycle. As previously described, a manufacturing adjustment in the length of this cycle is initially made by adjusting the position of screw 180 with respect to the follow-up plate 178. It can be seen that the screw 180 is rotated within the threaded portion of blade 352 to initially adjust the relative position of the end of the screw 180 to the surface of the cam follower plate 178.

As shown more particularly in FIG. 10, the timer cam follower plate 178 includes a portion 182 which extends downwardly from the top portion of the vertical wall 98 to a position below the bimetal blade 102, an upwardly extending portion 184, a rearwardly extending portion 186 and a cam contacting portion 188. As shown in FIG. 13, the top of the generally vertical portion 182 is fixed to a leaf spring 190 which is riveted or otherwise secured to the vertical wall 98 of the phenolic support. With this construction, the cam follower plate 178, and more particularly, the generally vertical cam contacting portion 188 is spring urged outwardly into engagement with a surface of a rotatable cam member 192.

It can be appreciated that counterclockwise rotation of the cam 192 manually moves the cam contacting portion 188 of the timer setting member toward the oven toaster to move the vertical arm 182 of the cam follower plate toward the adjusting screw 126, thereby decreasing the toasting time interval. Movement of the cam 192 in the opposite direction allows the cam follower plate 178 to move toward the vertical wall 98 and away from adjusting screw 126 thereby increasing the toasting time interval. Thus, when the manually rotatable control knob 62 is moved in a clockwise direction the length of the toasting time interval is increased, and when the timer control knob is rotated in a counterclockwise direction the length of the toasting time cycle is decreased.

The color cam member 192 and its associated parts are connected to the generally vertical wall 98 of the heat-up cool-down bimetal timer by a metal bracket 200. As shown more particularly in FIGS. 12, 13 and 14, the cam member 192 may be integrally formed of a phenolic plastic material to include a number of supporting surfaces and a cam surface 358 which is formed at its rear outer periphery for cooperating with the cam contacting portion 188 of the cam follower 178. The cam member 192 includes a generally circular bearing portion 360 for cooperating with the generally circular aperture 362 formed in bracket 200, a generally circular bearing portion 364 for cooperating with an aperture 366 formed in bracket 200 and an annular groove 368 for receiving a spring clip 370 for holding the cam member 192 on the bracket 200. As illustrated, the spring clip 370 is positioned within a notch 372 formed in the bracket and the arms of the clip are positioned within the annular groove 368.

With particular reference to FIG. 12, it can be appreciated that the bracket 200 for holding the cam 192 is generally U-shaped and includes an arm 374 having a notch 376 formed therein for gripping both sides of the generally vertical wall 98 of the timer body and an arm 378 which extends downwardly from the bracket for rigid attachment to the generally vertical wall of the timer body by means of a screw 375 or other suitable securing means. By this arrangement, the toast color cam 192–358 may be manually adjusted by rotating the knob 62 which extends from the front wall of the oven toaster in order to set the color and brownness of the toast desired by a user.

OVEN OPERATION

When it is desired to operate my improved oven toaster as an oven, the food to be cooked is inserted within the cooking chamber 15, and the front door 16 is closed to move the carriage lug 68 and its sleeve bearing 70 rearwardly to the position illustrated in FIG. 6 to permit the switch actuating lever 72–78 to close the main switch 48 and 51. Then the push button 60 is lifted from its OFF position to any one of the plurality of oven temperature setting positions indicated on the front plate 64. This movement causes the pivoted pushbutton lever 154 to be moved from its OFF position indicated in FIG. 5 to one of its oven temperature setting positions illustrated in FIG. 6. In moving from the position illustrated in FIG. 5 to the position illustrated in FIG. 6, the cam drive pin 160 which is fixed to lever 154 is lifted and slides against the upper surface of a slot 165 which is formed in the cam 162 to rotate the cam 162 about its pivot 164. This movement causes the detent lug pin 166–168 to be moved out of the OFF notch 169 of the cam 162 and onto the smooth circular surface 171 of the cam 162 to the left of the OFF notch 169, as illustrated in FIG. 6. This movement causes the detent lug 166–168 and the lever 71–73 to which it is attached to be moved downwardly against the force of spring 314 from the position illustrated in FIG. 5 to the position illustrated in FIG. 6. This downward movement of the lever 71–73 causes corresponding downward movement of the pivot 75 for the main switch actuating lever 72–78, which causes the lower portion of arm 72 of the lever to abut an upper surface of the carriage lug 68–70 to pivot the lever 72–78 about pivot pin 75 thereby moving the left arm 78 of the lever downwardly to move spring 80 downwardly to rotate the cam 83 to close the main switch contacts 48 and 51.

With the main switch 40 closed at the beginning of OVEN operation, the thermostat switch contacts 232 and 234 are also closed as shown in FIG. 8. In this position it can also be appreciated that upward movement of the push-button lever 154 from the off position illustrated in FIG. 5 to the oven position illustrated in FIGS. 6 and 8 causes the thermostat cam 240 to be moved from its off notch 248 on lug 244 to one of its on positions on lug 244. It can be seen that when the cam 240 is rotated from its off position illustrated in FIG. 7 to one of its on positions illustrated in FIG. 8, the on cam surface 250 of the cam 240 gradually slides on the end of projection 244 to move the thermostat switch blades 212 and 214 and the pin projection 236 further and further away from the bimetal insulator 238. Thus, as the distance between the end of pin 236 and the ceramic insulator 238 increases, the further the bimetal 224 has to travel to open the switch contacts 232 and 234, and hence, the higher the temperature setting of the oven. As shown by the indicia on the front plate 64 of the oven toaster, the lower oven temperature settings are located near the off position while the higher temperature settings are indicated at the top of the front plate 64. With the oven thermostat in the on position illustrated in FIG. 8, the thermostat 210 maintains the oven at the temperature set on the dial at the front of the oven toast by the action of the bimetal 224 in opening and closing the contacts 232 and 234 of the thermostat.

While the oven toaster is being operated as an oven the heat-up cool-down bimetal timer 82 is prevented from moving into its cool-down cycle to thereby prevent the heat-up cool-down bimetal timer from opening the main switch 48 and 51. As shown in FIGS. 3, 6 and 11, this is achieved by the position of the timer actuator 92 which is controlled by the latch mechanism 146, and particularly its pin 206–207. As shown in FIG. 11, the pin 206 simply rests on the actuator 92, and in this position the spring 93 of the actuator causes the actuator to be rotated clockwise to move the actuator arm 115 to the bottom of slot 117 to lower switch blade 110 to thereby maintain switch contacts 116 and 118 in their open position to prevent movement of the heat-up cool-down bimetal timer to its cool-down position.

During OVEN operation, an arrangement is provided for supplying a limited flow of current to the bimetal heater 106 in order to preheat the bimetal to about the same amount that it would be preheated by a TOAST cycle operation. Thus, should the oven toaster be used for toasting a slice of bread immediately following its use as an oven, the preheated timer 82 will properly control the degree of brownness of the toast. With particular reference to FIGS. 2 and 15, this is achieved by closing the function switch 262 during the oven operation to supply a limited amount of current to the bimetal heater 106 through the shunt resistor 260. As shown in FIG. 15, the function switch 262 is closed as the push-button lever 154 is lifted from the OFF position illustrated in FIG. 5 to the OVEN position illustrated in FIG. 6 to provide current to the bimetal heater 106 during OVEN operation.

While the oven toaster is being operated as an oven, it should be appreciated that should the front door 16 be opened even a small amount, the flow of current to the heating elements will be immediately stopped by opening the main switch 40. This results since even a slight opening of the door moves pin 68 and its sleeve bearing 70 forwardly from the position illustrated in FIG. 3 to allow the main switch spring blades 44 and 48 to rotate the switch cam 82 to the OFF position illustrated in FIG. 5. The spring blades themselves are strong enough to move the cam 82 downwardly when the spring actuator 80 is allowed to be moved slightly upwardly to pivot lever 72-78 clockwise as the pin 68 and its sleeve 70 are moved forwardly when the door 16 is opened.

TOASTER OPERATION

Should it be desired to use the oven toaster to toast a slice of bread after it has been used as an oven, it is merely necessary to place one or more slices of bread on the food rack 4, close the door, and move the push button 60 downwardly from its OFF position to its TOAST position. If the toast brownness knob 62 had been previously set to the desired brownness, there is normally no reason to make any adjustment in the brownness control knob 62 since the bimetal 102 of the timer 82 would have been preheated through the shunt resistor 260 and the function switch 262 while the cooking chamber was being used as an oven. Thus, the cooking chamber 15 and the heat-up cool-down bimetal timer 82 would be at about the same relative temperature with respect to each other following oven operation as they would be at the end of a prior toasting operation. Accordingly, the position of the rotatable brownness control knob 62 does not have to be adjusted unless it is desired to make a darker or lighter slice of toast than had been obtained during a prior toasting operation.

When the push-button knob 60 is moved downwardly from its OFF position illustrated in FIG. 5 to its TOAST position illustrated in FIG. 4, a number of things happen almost simultaneously. The rotatable cam 162 is rotated in a clockwise direction about its pivot 164 by the drive pin 160 which is fixed to and moves downwardly with the push-button lever 154. As the pin 160 rotates the cam 162, rotation of the cam forces the detent lug 166 out of the off notch 169 against the force of spring 314 to position the detent lug on the raised toast cam surface 167 of the rotatable cam 162. This results in a downward motion of lever 71-73 to cause a downward movement of the pivot 75 for lever 72-78. Since the door is in its closed position, the outwardly extending pin 68 on the food carriage link 28 is in the position illustrated in FIGS. 4 and 5. Thus, when the pivoted lever 154 is moved from the position shown in FIG. 5 to the position shown in FIG. 4, downward movement of the pivot 75 rotates the lever 72-78 in a counterclockwise direction to move the switch actuator lever 80 downwardly to thereby rotate the cam 82 to close switch contacts 48-51 to energize the heating elements to toast a slice of bread.

During movement of the lever 154 from the OFF position shown in FIG. 5 to the TOAST position shown in FIG. 4, the movement is opposed by the coil spring 158 which is compressed between the plastic button 337 which is fixed to the forward tab 338 of the push-button lever and the outwardly extending tab 326 which is formed on supporting plate 267. Downward movement of the lever 154 also causes downward movement of lever 320 and the lug 152 which extends outwardly from lever 320. This downward movement of lug 152 causes it to move into the latch slot 150 of lever 146 to pivot the lever 146 in a counterclockwise direction about pivot pin 148. Counterclockwise movement of lever 146 causes a generally rearward movement of the lugs 144 and 206 which are attached to the lower portion of lever 146. Lug 144 cooperates with a latch notch 142 which is formed in the solenoid lever 88-140, and thus, rearward movement of the lug 144 on the lower surface of lever 140 allows the lug and its sleeve bearing 161 to roll or slide rearwardly until they are positioned within the notch 142. At that time further rearward movement is restricted by the rear surface of the notch. During this rearward movement of the lug 144 on the lower surface of lever 140, an internal spring of the solenoid 132 urges the solenoid lever 88-140 in a counterclockwise direction about pivot pin 346. Thus, when the pin 144 reaches the notch 142, the entire solenoid lever 88-140 is pivoted in a counterclockwise direction by the internal spring of the solenoid to move the lug 144 into notch 142. Accordingly, as shown in FIG. 4 latch notch 142 holds latch lever 146 which in turn holds the lug pin 152 of lever 320 to hold the primary manual setting lever 154 in its downward TOAST position against the force of spring 158 during the entire toasting cycle.

At the same instant that the lug 144 is moved rearwardly into the latch notch 142, lug 206 and its sleeve bearing 207 is also moved rearwardly to move the bimetal timer actuator 92 from its OFF position illustrated in FIG. 11 to its TOAST position illustrated in FIG. 12. This movement is resiliently opposed by spring 93 which normally holds the actuator 92 and its lug 115 downwardly to prevent contacts 108-109 from being opened and contacts 116-118 from being closed to thereby prevent the heat-up cool-down bimetal timer 82 from shifting from its heat-up cycle to its cool-down cycle. Thus, at the beginning of the TOAST cycle lug 206 and its sleeve bearing 207 pivots the bimetal actuator 92 clockwise to lift lug 115 above switch blade 110 to permit the switch blade to be moved upwardly at the end of the bimetal heat-up cycle to permit cool-down operation of the timer 82.

When the push-button lever 154 is moved downwardly from its OFF position illustrated in FIG. 5 to its TOAST position illustrated in FIG. 4, it operates on the top surface of the insulated tab 264 and lever 294 to move the insulated tab 264 downwardly to open the function switch 262 during the TOAST cycle. Thus, the shunt resistor 260 is effectively removed from the circuit during the toasting cycle and the full current is applied to the bimetal heater wire 106 during the toasting cycle.

Figure 14:
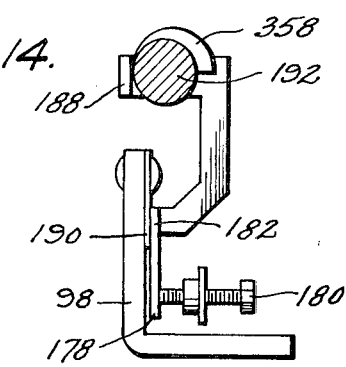
FIG. 14 is a fragmentary cross-sectional view similar to FIG. 13 showing the color cam mechanism in its lowest setting for setting the timer to make very dark toast.

The parts of the bimetal heat-up cool-down timer remain in the positions illustrated in FIGS. 2, 12 and 14 during the bimetal heat-up cycle. As the bimetal 102 is heated, its central portion bulges outwardly away from the generally vertical wall 98 to move the switch lever 110 which is connected to it from the position illustrated in FIG. 14 to the position illustrated in FIG. 13. When the switch lever reaches the position shown in FIG. 13, it has moved far enough outwardly from a plastic lug 114 which is integrally formed with the vertical wall 98 of the bimetal support, that it moves out from under the lug 114. Since the switch lever 110 is normally spring biased upwardly it slides upwardly on the outer surface of the lug 114 to move the transverse switch blade 112 upwardly to close contacts 116-118 and open contacts 108-109 to thereby terminate the flow of current to the bimetal heater wire 106 to place the bimetal heat-up cool-down timer in its cool-down position. The contacts 116-118 remain closed to permit a continuous flow of current to the heating elements 22, 23, 24 and 25 of the oven toaster while the oven toaster bimetal timer 82 is in its cool-down cycle.

As the bimetal 102 cools down, its left end which is provided with contact 124 moves toward a contact screw 126. This occurs since the switch blade 110 is now restrained from moving inwardly from the position shown in FIG. 13 to the position shown in FIG. 14 by the abutment 114. Thus, the contact 124 at the end of the bimetal 102 moves toward the contact screw 126 during the bimetal cool-down cycle.

As shown in FIG. 2, when the contact 124 is moved into engagement with contact screw 126 the circuit to the solenoid 132 is closed, and with reference to FIGS. 4 and 5 the solenoid 132 pulls the solenoid lever 88 to the right about its pivot pin 344 to cause the hammer 136 to ring the bell 138 to indicate the end of a toasting cycle. At the same instant, the solenoid lever 88 lifts its arm 140 to release lug 144 from latch notch 142 to allow lever 146 to pivot clockwise under the force of springs 158 and 93 to release latch notch 150 from pin 152 to permit the primary manual setting lever 154 to be moved upwardly to its OFF position illustrated in FIG. 5. At the same instant that the lever 154 is moved upwardly, its cam 162 is rotated in a counterclockwise direction to move the detent lug 166 from the TOAST cam surface 167 into the OFF notch 169. During this movement, it can be appreciated that the lever 71–73 is moved upwardly by spring 314 to move pivot 75 upwardly to allow lever 72–78 to be rotated in a clockwise direction about pivot 75 to lift the end of lever 78 and the spring actuating lever 80 of switch 40 to open the main switch contacts 48–51.

From the foregoing description it will be appreciated that my improved heat-up cool-down bimetal timer may be very accurately adjusted and calibrated during manufacture. The manufacturing adjustment or calibration in the heat-up time period of the bimetal is adjusted by a screw 180 which is fixed to a separate bimetal control blade 350 which is positioned between the bimetal and the generally vertical wall 98 of the timer body. The screw 180 abuts a substantial cam follower plate 178 and the adjustment may be made without touching the bimetal blade 102, thus, reducing calibration errors due to operator deformation of the bimetal blade. The adjusting screw 180 for the heat-up cycle is closely positioned adjacent to the calibration screw 126 for the cool-down cycle so that both adjustments can be readily made at the same time. It can also be appreciated that the manual toast color cam mechanism 192–200 is connected to the relatively rigid vertical wall 98 of the timer body in order to minimize changes in calibration due to manufacturing tolerances between the front plate and other components of the oven toaster. Accordingly, an exceedingly reliable and accurate heat-up cool-down bimetal timer is achieved with relatively few parts which may be readily connected to each other.

What I claim is:

1. An electric toaster with a heat-up cool-down bimetal timer comprising:
   a. a rigid timer body member;
   b. an electric resistance wire heater for toasting a slice of bread;
   c. a first electric circuit including said electric resistance wire for toasting a slice of bread;
   d. a heat-up cool-down bimetal having two end portions, one of the end portions of said bimetal being connected to said body member and the other end portion being a free end portion;
   e. a second electric circuit including an electric resistance wire for heating said bimetal;
   f. a bimetal control member positioned adjacent to said bimetal and being provided with a pivot surface which is arranged in engagement with the free end portion of said bimetal;
   g. a pair of switch contacts in said second electric circuit which are closed for energizing the electric resistance wire for heating the bimetal during its heat-up cycle and opened by said bimetal to prevent energization of said electric resistance wire for heating said bimetal when the bimetal is in its cool-down cycle; and
   h. a calibration member movably supported on said bimetal control member for setting the position of said bimetal control member and its pivot for the bimetal for controlling the amount of movement of the bimetal necessary to open said switch contacts to thereby control the duration of said bimetal heat-up cycle.

2. An electric toaster with a heat-up cool-down bimetal timer as defined in claim 1 wherein said calibration member is a screw which is threaded through said bimetal control member.

3. An electric toaster with a heat-up cool-down bimetal timer as defined in claim 1 wherein a timer actuating member is rotatably mounted on said timer body member for preventing or allowing said pair of contacts to be moved to an open position.

4. An electric toaster with a heat-up cool-down bimetal timer as defined in claim 3 wherein a switch blade is mounted on said timer body adjacent to said first pair of switch contacts for opening and closing said switch contacts and said timer actuating member is positioned adjacent to said switch blade for selectively holding said switch blade in one position to prevent said switch blade from opening said contacts as a result of heating the bimetal.

5. An electric toaster with a heat-up cool-down bimetal timer as defined in claim 1 wherein said timer actuating member is rotatably mounted on said timer body member and is spring biased toward said switch blade for holding said switch blade to prevent said pair of switch contacts in said second electric circuit from being opened by said bimetal.

6. An electric toaster with a heat-up cool-down bimetal timer comprising:
   a. a rigid timer body member;
   b. an electric resistance wire heater for toasting a slice of bread;
   c. a first electric circuit including said electric resistance wire for toasting a slice of bread;
   d. a heat-up cool-down bimetal having two end portions, one of the end portions of said bimetal being connected to said body member and the other end portion being a free end portion;
   e. a second electric circuit including an electric resistance wire for heating said bimetal and said electric resistance wire for toasting a slice of bread;
   f. a bimetal control blade connected to said body member and positioned adjacent to said bimetal, said bimetal control blade being provided with a pivot surface which is arranged in engagement with the free end portion of said bimetal;

g. a pair of switch contacts in said second electric circuit which are closed for energizing the electric resistance wire for heating the bimetal during its heat-up cycle and opened to prevent energization of said electric resistance wire for heating said bimetal when the bimetal is in its cool-down cycle;

h. an actuator blade connected to said bimetal and in operative connection with said switch contacts to open said switch contacts after said bimetal has moved a predetermined amount during its heat-up cycle; and i. a calibration member movably supported on the free end portion of said bimetal control blade for setting the position of said bimetal control blade and its pivot for the bimetal for controlling the amount of movement of the bimetal necessary to open said switch contacts to thereby control the duration of said bimetal heat-up cycle.

7. An electric toaster with a heat-up cool-down bimetal timer comprising:

a. a rigid timer body member;

b. an electric resistance wire heater for toasting a slice of bread;

c. a first electric circuit including said electric resistance wire for toasting a slice of bread;

d. a heat-up cool-down bimetal having two end portions, one of the end portions of said bimetal being connected to said body member and the other end portion being a free end portion;

e. a second electric circuit including an electric resistance wire for heating said bimetal and said electric resistance wire for toasting a slice of bread;

f. a bimetal control member having a pivot surface arranged in pivotal engagement with the free end portion of said bimetal;

g. a pair of switch contacts in said second electric circuit which are closed for energizing the electric resistance wire for heating the bimetal during its heat-up cycle and opened by said bimetal to prevent energization of said electric resistance wire for heating said bimetal when the bimetal is in its cool-down cycle; and h. a manually adjustable member connected to said body member and positioned between said body member and said bimetal control member for adjusting the position of said bimetal control member with respect to the body member and the bimetal.

8. An electric toaster with a heat-up cool-down bimetal timer as defined in claim 7 wherein said manually adjustable member includes a cam follower which is integrally formed therewith and a cam is provided for moving said cam follower, said cam being rotatably supported for movement on a bracket which is rigidly fixed to said timer body so that the supporting bracket for said cam is fixed with respect to the timer body to minimize any calibration errors due to movement between the support for the bimetal and the support for the cam.

9. An electric toaster with a heat-up cool-down bimetal timer comprising:

a. a first electric circuit including an electric resistance wire heater for toasting a slice of bread;

b. a main switch for controlling energization of said electric resistance wire heater;

c. an electric solenoid for opening the main switch at the end of the toasting cycle;

d. a generally L-shaped timer body member formed of suitable insulating material having a generally vertical wall portion and generally horizontal wall portion;

e. a heat-up cool-down bimetal having two end portions, one of the end portions of said bimetal being connected to said body member and the other end portion being a free end portion;

f. a second electric circuit including an electric resistance wire for heating said bimetal;

g. a first pair of switch contacts mounted on said body member for controlling energization of said electric resistance wire bimetal heater;

h. a second pair of contacts outside of said bimetal heater circuit for controlling energization of said main electric toaster heater circuit when the first pair of switch contacts are opened during bimetal cool-down;

i. a third pair of contacts mounted on said supporting member for controlling energization of said solenoid at the termination of said cool-down cycle, one of said contacts of said third pair of contacts being mounted at the end of the bimetal and being moved into contact with the other contact of said third pair of contacts when the bimetal cools down at the end of a toasting cycle;

j. a manually adjustable mechanism for setting toast brownness by adjusting a pivot point of the bimetal and the relative position of said one of said contacts of said third pair of contacts to the other contact of said third pair of contacts including:

j1. a flexible bimetal control blade mounted on the generally vertical wall portion of said body member and positioned between said wall and said bimetal, said control blade having a pivot surface arranged in pivotal engagement with the free end portion of said bimetal;

j2. a heat-up calibration screw threaded through an aperture formed in the end of said bimetal control blade extending toward the generally vertical wall portion of the body member;

j3. a cam follower resiliently mounted on the generally vertical wall of said body member and positioned adjacent to an end of said heat-up calibration screw;

j4. a cam positioned adjacent to said cam follower for moving said cam follower toward or away from said heat-up calibration screw to move the end of said flexible bimetal control blade and its pivot away from said vertical wall to move the bimetal and said one of said contacts of said third pair of contacts toward said other contact of said third pair of contacts; and j5. said heat-up calibration screw being movable within the aperture formed in the end of said flexible blade for adjusting the distance between the cam follower and the bimetal control blade to provide a manufacturing adjustment in the brownness setting of the heat-up cool-down bimetal timer.

10. An electric toaster with a heat-up cool-down bimetal timer as defined in claim 6 wherein a cooldown calibration screw is threaded through a bracket which is fixed to the vertical wall portion of said timer body and extends toward the generally vertical wall portion of the body, the end portion of said cool-down adjusting screw being the other contact of said third pair of contacts, and said heat-up and cool-down calibration screws extending in the same direction and being positioned adjacent to each other so that both of said screws may be readily adjusted during manufacture of the heat-up cool-down bimetal timer.

11. An electric toaster with a heat-up cool-down bimetal timer comprising:
  a. a first electric circuit including an electric resistance wire heater for toasting a slice of bread;
  b. a main switch for controlling energization of said electric resistance wire heater;
  c. an electric solenoid for opening the main switch at the end of the toasting cycle;
  d. a generally L-shaped timer body member formed of suitable insulating material having a generally vertical wall portion and a generally horizontal wall portion;
  e. a heat-up cool-down bimetal having two end portions, one of the end portions of said bimetal being connected to said body member and the other end portion being a free end portion member;
  f. a second electric circuit including an electric resistance wire for heating said bimetal;
  g. a switch contact fixed to said bimetal;
  h. a second switch contact formed as an adjusting screw spaced outwardly from said bimetal for cooperating with said first contact to energize said solenoid at the end of the cool-down cycle of said bimetal;
  i. a flexible bimetal control blade positioned between said vertical body wall and said bimetal; and
  j. an adjusting screw threaded through said bimetal control blade for adjusting the relative position of said control blade and said bimetal to said generally vertical wall to thereby adjust the heat-up time period of said bimetal during manufacture by rotating said adjusting screw.

12. A heat-up cool-down bimetal timer as defined in claim 11 wherein a cam follower plate is positioned between said vertical wall and said adjusting screw, and a rotatable cam is provided for moving said cam follower to move said adjusting screw to thereby adjust the relative position of said flexible bimetal control blade with respect to said vertical wall in order to manually adjust the heat-up cycle of said timer to thereby provide a manual adjustment in the total time interval set by said bimetal timer.

13. An electric toaster with a heat-up cool-down bimetal timer comprising:
  a. a rigid timer body member;
  b. an electric resistance wire heater for toasting a slice of bread;
  c. a first electric circuit including said electric resistance wire for toasting a slice of bread;
  d. a heat-up cool-down bimetal having two end portions, one of the end portions of said bimetal being connected to said body member and the other end portion being a free end portion;
  e. a second electric circuit including an electric resistance wire for heating said bimetal;
  f. a pair of switch contacts in said second electric circuit which are closed for energizing the electric resistance wire for heating the bimetal during its heat-up cycle and opened by said bimetal to prevent energization of said electric resistance wire for heating said bimetal when the bimetal is in its cool-down cycle;
  g. a timer actuating member rotatably mounted on said timer body member for preventing or allowing said pair of switch contacts to be moved to an opened position by heating of the bimetal, said actuator being movable to an off position wherein said pair of contacts are prevented from being opened and said actuator being movable to an on position for allowing said pair of contacts to be opened at the end of a bimetal heat-up cycle to thereby permit toaster operation of said bimetal timer; and
  h. a primary manual setting mechanism mounted for movement to any one of a plurality of positions to control operation of said timer, said primary manual setting mechanism having an off position wherein it is spaced from said timer actuating member for permitting said timer actuating member to retain said pair of said contacts in their closed position, and said primary manual setting mechanism being movable to an on position for moving said timer actuating member to permit said pair of contacts to be moved to an open position at the end of a bimetal heat-up cycle.

* * * * *